(12) United States Patent
Hogan

(10) Patent No.: US 7,701,869 B2
(45) Date of Patent: Apr. 20, 2010

(54) GENERATING A DATA FLOW DIAGRAM

(75) Inventor: Kevin M. Hogan, Austin, TX (US)

(73) Assignee: National Instruments Corporation, Austin, TX (US)

( * ) Notice: Subject to any disclaimer, the term of this patent is extended or adjusted under 35 U.S.C. 154(b) by 283 days.

(21) Appl. No.: 11/780,533

(22) Filed: Jul. 20, 2007

(65) Prior Publication Data
US 2008/0019378 A1    Jan. 24, 2008

Related U.S. Application Data

(60) Provisional application No. 60/820,063, filed on Jul. 21, 2006.

(51) Int. Cl.
*H04L 1/00*       (2006.01)
*H04L 12/26*    (2006.01)

(52) U.S. Cl. .................. 370/252; 370/229; 370/254

(58) Field of Classification Search ................ 370/229, 370/252, 254
See application file for complete search history.

(56) References Cited

U.S. PATENT DOCUMENTS 5,481,741 A    1/1996   Kodosky et al.
5,732,277 A    3/1998   Kodosky et al.
7,076,411 B2   7/2006   Santori et al.

OTHER PUBLICATIONS

"Writing S Functions," The MathWorks, Version 5, 1998-2003, 564 pages.

*Primary Examiner*—Ronald Abelson
(74) *Attorney, Agent, or Firm*—Meyertons Hood Kivlin Kowert & Goetzel, P.C.; Jeffrey C. Hood; Mark S. Williams

(57) ABSTRACT

System and method for generating a data flow diagram. A data flow diagram is provided that includes one or more non-input bound data flow (NIBDF) nodes, each with a respective functionality, and at least one of which is a subsystem node representing a non-input bound data flow sub-diagram comprising a plurality of interconnected nodes. All non-input bound data flow nodes in the data flow diagram are converted into input bound data flow (IBDF) nodes to produce an IBDF diagram, including: for each NIBDF subsystem node in the data flow diagram: partitioning the NIBDF sub-diagram into a plurality of IBDF sub-diagrams that operate according to input bound data flow semantics without changing data dependencies of the NIBDF sub-diagram, and including a plurality of IBDF nodes respectively representing the plurality of IBDF sub-diagrams in the IBDF diagram in lieu of the NIBDF subsystem node. The IBDF diagram is then stored.

31 Claims, 15 Drawing Sheets

82
computer system

GENERATING A DATA FLOW DIAGRAM

PRIORITY DATA

This application claims benefit of priority of U.S. provisional application Ser. No. 60/820,063 titled "Hierarchical Code Generation for Simulation Subsystems" filed Jul. 21, 2006, whose inventor was Kevin M. Hogan.

FIELD OF THE INVENTION

The present invention relates to the field of graphical programming and more particularly to the generation of input bound data flow diagrams from non-input bound data flow diagrams.

DESCRIPTION OF THE RELATED ART

Various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al. disclose a graphical programming environment which enables a user to easily and intuitively create a graphical program. Graphical programming environments such as that disclosed in Kodosky et al. can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as National Instruments Corporation's LabVIEW™ product have become very popular. Tools such as LabVIEW, which embodies the G graphical programming language, have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Different graphical programming systems may use different models of computation, e.g., different semantics, to specify or represent the functionality of the graphical programs. Examples of graphical program semantics include homogenous data flow, heterogeneous data flow, synchronous data flow, timed synchronous data flow, state machine, cyclostatic data flow, dynamic data flow, input bound data flow, and various combinations, among others. A graphical programming system that facilitates the development of graphical programs and data flow diagrams with different models of computation or type of data flow semantics have been described in U.S. application Ser. No. 10/869,572 titled "Graphical Data Flow Programming Environment With First Model Of Computation That Includes A Structure Supporting Second Model Of Computation" filed Jun. 16, 2004, whose inventors were Gregory O. Morrow, John C. Limroth, Jeffrey L. Kodosky, Steven W. Rogers, Kevin Hogan, and Hugo A. Andrade, which is hereby incorporated by reference.

One important computational application involving different models of computation is a simulation computation. A simulation computation generally involves computing the values of state variables according to a simulation model. The state of the simulation model is computed at a sequence of time steps, i.e. $t_0, t_1, t_2, \ldots t_n$ whereby the state of the model at time $t_{n+1}$ depends on the state of the model at time $t_n$. For states that vary continuously, the rate of change of a state variable X at a time t may be given in dependence to X(t) by a function f, such that $dX/dt=f(X(t))$, which describes an integrating function. For discrete states, the computation similarly involves a formula to compute the value for the state at a new time step given its previous value. Computational algorithms and analytical methods for developing simulation models and state variables are well-known in the art.

In a graphical programming environment, subsystems (representative nodes in the graphical program that may support a different model of computation) may be employed for developing a simulation model. One example of such a subsystem is a simulation diagram in LabVIEW (which is implemented in the G graphical data flow programming language, simply referred to herein as the G language). Some graphical programming languages, such as G, operate according to a data flow semantic (or model of computation) in which a node may not execute or provide output unless all input data to the node are present. As used herein, this type of data flow is referred to as input bound data flow (IBDF).

A simulation diagram may be a type of data flow diagram, but may not adhere strictly to the input bound data flow model of computation normally applied in the G language. For example, there may be nodes that execute or provide output whether or not all their inputs are present, which is behavior inconsistent with the input bound data flow semantics of the G language. This type of data flow is referred to herein as non-input bound data flow (NIBDF). A data flow diagram that only includes IBDF nodes is referred to as an IBDF diagram.

In some applications, it may be desirable to convert a non-input bound data flow diagram into an input bound data flow diagram, in which case, each NIBDF node in the diagram may be replaced with two or more IBDF nodes that are operable to provide the functionality of the original NIBDF node. For example, in an example simulation application, a generic integration block or node of a simulation subsystem (representing the basic function for determining state variables in a simulation model) may be equivalently described by two separate, asynchronous G-language functions: a get state function (for returning the current value of X(t)) and a set state function (for determining the current value of dX/dt). This type of equivalence permits the conversion of a NIBDF subsystem into an IBDF diagram, e.g., wherein each integration block or node may be replaced with two independent G-language (IBDF) function nodes, e.g., IBDF nodes that may be called separately. Thus, any NIBDF node may be replaced with two or more IBDF nodes with suitable functionality.

As noted above, some nodes in a data flow diagram, referred to as subsystem nodes, may represent other diagrams, e.g., sub-diagrams, which may each include a plurality of interconnected nodes. Some of these subsystem nodes may be NIBDF nodes, and thus may not operate according to IBDF semantics. For example, an NIBDF subsystem node may include one or more NIBDF nodes in its sub-diagram, or the sub-diagram may operate according to NIBDF semantics even if it includes no NIBDF nodes.

In order to create a homogenous IBDF diagram from a NIBDF diagram containing NIBDF subsystem nodes, one known method is to inline all the subsystem nodes of the data flow diagram, i.e., expand all subsystem nodes into their sub-diagrams in the NIBDF diagram, and convert any NIBDF nodes into IBDF nodes. In other words, inlining refers to collapsing all the hierarchies in the data flow diagram into a collection of data flow nodes or operations on a single top-level diagram.

While this method may be satisfactory for some simple algorithms, more complex systems, e.g., complex simulation systems, which exhibit deep hierarchies of subsystems, may result in a multitude of inlined nodes, many of which may be duplicates or redundant. In fact, for each level of hierarchy, the number of inlined nodes may increase non-linearly. This may result in a large and inefficient memory footprint and unwieldy structure, resulting in higher maintenance requirements for larger, more complex algorithms which incorporate many levels of hierarchy. In applications where the data flow diagrams are compiled for execution, conversion of data flow diagrams do not adhere to the homogenous input bound data flow model of computation, wiring contexts which may result from a direct expansion of simulation subsystems (i.e., inlining the entire hierarchy) may not represent an efficient representation of the data flow code, and may compile particularly slowly with unnecessarily large memory consumption.

Thus, improved systems and methods for creating homogeneous input bound data flow diagrams are desired.

SUMMARY OF THE INVENTION

Various embodiments of a system and method are presented for generating a data flow diagram, more specifically, for generating an input bound data flow diagram from a non-input bound data flow diagram. In one embodiment, a data flow diagram may be provided. The data flow diagram may be received from an external system, e.g., over a network, retrieved from memory, or developed by the user. The data flow diagram may include one or more non-input bound data flow nodes, each with a respective functionality. At least one non-input bound data flow node in the data flow diagram is a subsystem node representing a non-input bound data flow sub-diagram that includes a plurality of interconnected nodes. Note that, as described above, the non-input bound data flow sub-diagram may be a non-input bound data flow entity because it includes at least one non-input bound data flow node, or the sub-diagram may only include input bound data flow nodes, but still be a non-input bound data flow entity because of its structure, i.e., its topology.

All non-input bound data flow nodes in the data flow diagram may be converted into input bound data flow nodes to generate an input bound data flow diagram, i.e., a data flow diagram that includes no non-input bound data flow nodes. The conversion may include processing each non-input bound data flow node in the data flow diagram. For example, the non-input bound data flow node may be analyzed to determine two or more input bound data flow nodes executable to perform the functionality of the non-input bound data flow, where each of the two or more input bound data flow nodes is independently callable, i.e., two or more input bound data flow nodes are independent. Moreover, for each non-input bound data flow node that is a subsystem node, the analyzing may include partitioning the non-input bound data flow sub-diagram into a plurality of input bound data flow sub-diagrams, where each of the input bound data flow sub-diagrams operates according to input bound data flow semantics without changing data dependencies of the non-input bound data flow sub-diagram, and where the determining the two or more input bound data flow nodes includes determining two or more input bound data flow nodes respectively representing the plurality of input bound data flow sub-diagrams. Thus, input bound data flow nodes may be determined that correspond to the non-input bound data flow node.

In some embodiments, the determining of the two or more input bound data flow nodes may include: if any of the two or more input bound data flow nodes have not already been created, the method may include creating the input bound data flow nodes that have not already been created based on the functionality of the non-input bound data flow node, and storing the created input bound data flow nodes, and if any of the two or more input bound data flow nodes have already been created, the already created input bound data flow nodes may be retrieved. In some embodiments, creating the two or more input bound data flow nodes may be performed automatically, while in other embodiments, creating the two or more input bound data flow nodes may be performed manually, e.g., by a user specifying or creating the node in a graphical programming development environment. The two or more input bound data flow nodes may be included in the input bound data flow diagram in lieu of the non-input bound data flow node. In other words, the determined two or more input bound data flow nodes placed or inserted into the input bound data flow diagram in instead of the non-input bound data flow node.

Finally, the generated the input bound data flow diagram may be stored, e.g., in a memory medium. Note that the input bound data flow diagram is characterized by an input bound data flow model of computation, since no non-input bound data flow nodes remain in the converted/generated diagram. It is still possible, however, that some subsets of the diagram may have non-input bound data flow behavior, but such behavior is due to the architecture or arrangement of the nodes, not due to the nodes themselves.

Note further that because of the partitioning and determining of nodes representing the input bound data flow sub-diagrams, i.e., representing the partitions above, the number of (input bound data flow) nodes in the generated diagram is less than would be the case were the input bound data flow sub-diagrams left as is. Thus, while the respective replacement of non-input bound data flow nodes with respective two or more input bound nodes may substantially increase the total number of nodes in the diagram, the partitioning and substituting of input bound data flow nodes for the input bound data flow sub-diagrams serves to ameliorate this increase in total number of nodes.

In some embodiments, the conversion may be automatic. In other words, the analyzing and including may be performed automatically, e.g., via execution of program instructions. However, in other embodiments, at least some user input may be required to perform some of the method elements described.

In some embodiments, the non-input bound data flow sub-diagram may initially include at least one non-input bound data flow node, in which case analyzing the non-input bound data flow node may further include performing the analyzing and including for each non-input bound data flow node in the non-input bound data flow sub-diagram. In other words, these nodes in the sub-diagrams may also be converted in the same manner, prior to the partitioning of the sub-diagram. More generally, the data flow diagram may be hierarchical, with sub-diagrams at any of various levels.

In preferred embodiments, the partitioning may be performed based on input and output data dependencies of the interconnected nodes of the non-input bound data flow sub-diagram. Thus, in order to avoid introducing new data dependencies, nodes may be grouped into portions or partitions of the sub-diagram, according to their dataflow dependencies. For example, nodes have a dataflow dependence on the input to a subsystem (sub-diagram) if there is a direct dataflow path between the input to the subsystem and an input to the node. An output of the subsystem has a dataflow dependency on a node if there is a direct dataflow path between an output of the node and the original output of the subsystem. Once these dataflow dependencies are computed, nodes that depend on the same set of subsystem inputs may be grouped together. Alternatively, nodes on which the same set of subsystem outputs depend may be grouped together. In one embodiment, both strategies for grouping nodes into clumps may be used, and the strategy which results in the fewest partitions chosen.

In some embodiments, a more sophisticated analysis of dependencies may result in a more efficient partitioning strategy. For example, in one embodiment, the partitioning may include computing a feed-through map for the non-input bound data flow sub-diagram indicating dependencies of each output of the non-input bound data flow sub-diagram upon inputs of the non-input bound data flow sub-diagram, and analyzing the feed-through map to determine at least two of the input bound data flow sub-diagrams that, if merged, would not produce any new data dependencies of the outputs of the non-input bound data flow sub-diagram upon inputs of the non-input bound data flow sub-diagram. The at least two of the input bound data flow sub-diagrams may then be merged. Note that such merging of input bound data flow sub-diagrams decreases the number of partitions, and thus the number of corresponding input bound data flow nodes needed to represent the input bound data flow sub-diagrams in the top-level diagram, i.e., the data flow diagram.

Given the strategy for grouping nodes into partitions above, the potential number of partitions may be reduced by reducing the number of inputs or outputs to the subsystem. This may be achieved by treating subsystem inputs or outputs which have the same dataflow dependencies as equivalent. That is, subsystem inputs with equivalent sets of dependent subsystem outputs can be treated as the same input for the purposes of the partitioning algorithm. Similarly, subsystem outputs which are dependent on equivalent sets of subsystem inputs may be treated as the same output.

In preferred embodiments, the conversion of non-input data flow nodes to input bound data flow nodes may include performing the partitioning and including for each non-input bound data flow subsystem node in the data flow diagram in a recursive manner. In various embodiments, this recursion may be performed in a depth-first manner, or, alternatively, in a breadth-first manner, such techniques being well-known in the art of graph theory. In a preferred embodiment, the recursion is performed depth-first, starting at the bottom (the deepest nodes in the hierarchy, i.e., leaf nodes). For example, one or more leaf subsystems may be selected for processing in a parallel or sequential manner, where each non-input bound data flow node (e.g., indirect API block) may be decomposed or expanded into its corresponding functional nodes, e.g., G-language input bound data flow equivalent functions. Note that direct API blocks (i.e., input bound primitive or atomic data flow nodes) may directly link to their G-language equivalents, and may not require decomposition. Note also that in this embodiment, since the initial processing operates on leaf subsystems, no further subsystems are embedded in the simulation diagrams at this level in the hierarchy. Thus, the operations may convert a leaf-node simulation subsystem into executable graphical program code, e.g., G-language code, i.e., a block diagram of a virtual instrument.

Thus, an input bound data flow diagram (i.e., a data flow diagram whose nodes are all input bound data flow nodes) may be generated from a non-input bound data flow diagram (i.e., a data flow diagram whose nodes may include non-input bound data flow nodes).

While embodiments described above relate to various nodes and subsystems (e.g., subdiagrams or subVIs), it should be noted that similar methods may apply to any graphical structures which contain code. For example, similar methods may apply to loop or iteration structures, in place memory structures, target execution icon structures, case structures, etc.

BRIEF DESCRIPTION OF THE DRAWINGS

A better understanding of the present subject matter can be obtained when the following detailed description of the preferred embodiment is considered in conjunction with the following drawings, in which.

Figure 1A:
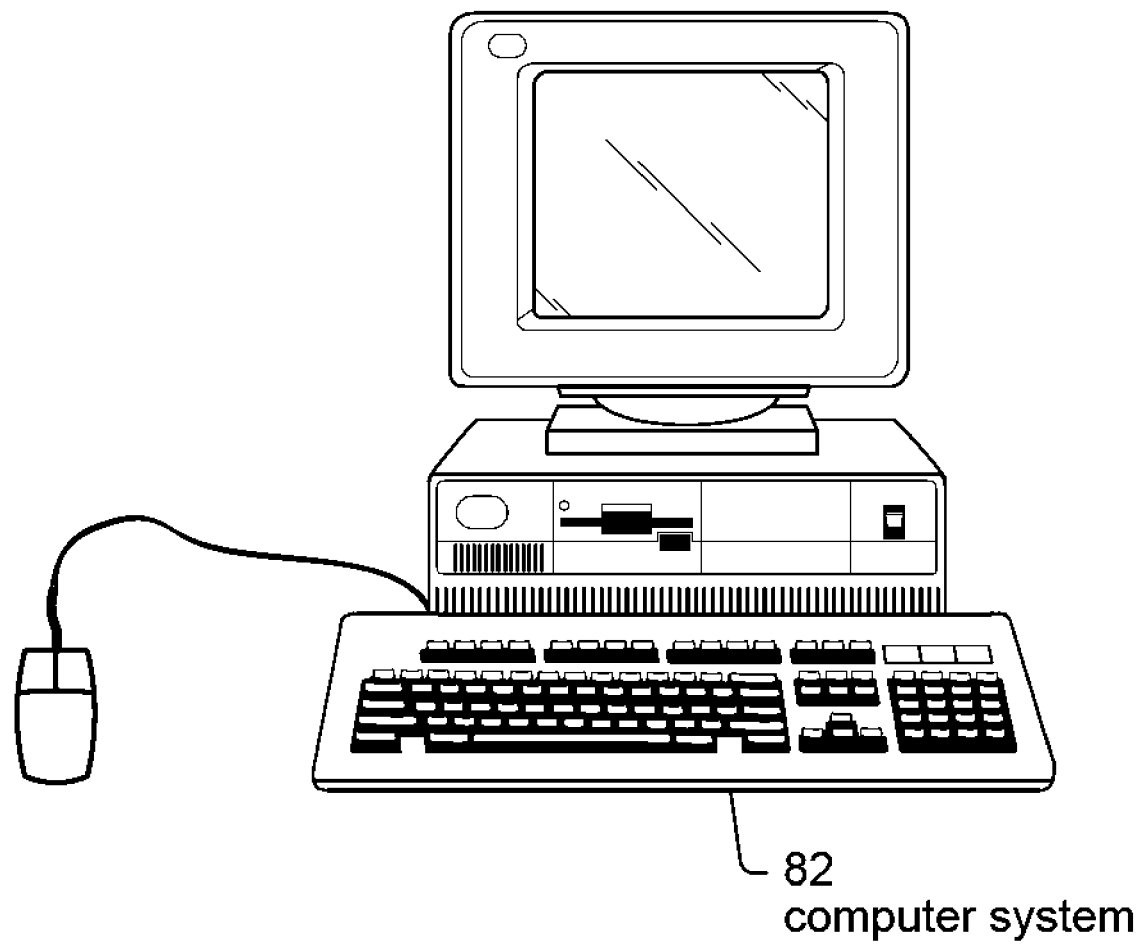
FIG. 1A illustrates a computer system operable to execute a graphical program according to an embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Provisional Application Ser. No. 60/820,063 titled "Hierarchical Code Generation for Simulation Subsystems" filed Jul. 21, 2006.

U.S. Provisional Application Ser. No. 60/571,205 titled "Graphical Data Flow Programming Environment with First Model of Computation that Includes a Structure Supporting Second Model of Computation", filed May 14, 2004.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,219,628 titled "System and Method for Converting Graphical Programs Into Hardware Implementations" filed Mar. 22, 2000.

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 2001/0020291 (Ser. No. 09/745,023) titled "System and Method for Programmatically Generating a Graphical Program in Response to Program Information," filed Dec. 20, 2000.

U.S. Pat. No. 7,043,693 titled "System and Method for Programmatically Generating a Second Graphical Program Based on a First Graphical Program", filed Dec. 20, 2000.

U.S. Patent Application Publication No. 2003/0172369 (Ser. No. 10/094,198 titled "Self-Determining Behavior Node For Use In Creating A Graphical Program", filed Mar. 8, 2002.

U.S. Patent Application Publication No. 2005/0257194 (Ser. No. 10/869,572) titled "Graphical Data Flow Programming Environment With First Model Of Computation That Includes A Structure Supporting Second Model Of Computation" filed Jun. 16, 2004.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

A graphical program that has a "homogenous model of computation" is a graphical program which is "single rate", i.e., where the semantics may specify a single rate execution of graphical program elements. In other words, each of the graphical program elements in the graphical program preferably has the same rate of execution, e.g., each element may execute the same number of times per execution of the graphical program, e.g., each element may produce and consume the same number of tokens per execution.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node. In an input bound data flow diagram, i.e., a data flow diagram with an input bound data flow model of computation, no node may execute or produce an output until all inputs are present, whereas a non-input bound data flow diagram may allow nodes to execute or produce output without all inputs being present.

Model of Computation—a formal description that includes a syntax and rules for computing behavior (semantics) described by the syntax; used to specify the semantics of computation and concurrency. Examples of models of computation include, data flow, control flow, state machine (e.g., finite state machine), actor, parallel random access machine, continuous time, spatial/temporal, synchronous/reactive, discrete event, cycle driven, synchronous message passing, asynchronous message passing, rendezvous, Turing machine, tagged signal, Petri nets, homogenous, heterogeneous, single rate, multi-rate, and combinations thereof, among others. Examples of different data flow models of computation include homogenous data flow, heterogeneous data flow, synchronous data flow, timed synchronous data flow, cyclostatic data flow, dynamic data flow, input bound data flow, and non-input bound data flow, among others. Some data flow models of computation may support explicit feedback loops, where, for example, output from a graphical program element may be provide as input to the same element, either directly, or via one or more other elements.

For example, the "G" graphical programming language, used in the LabVIEW™ graphical program development environment provided by National Instruments Corporation, supports a homogeneous (i.e., single rate) data flow model of computation that does not include explicit feedback loops. In contrast, Simulink™, provided by The MathWorks, Inc., supports a heterogeneous (multi-rate) data flow model of computation that includes explicit feedback loops. Similarly, "G" generally operates according to input bound data flow semantics, where no node executes until all its inputs are present, whereas some other graphical programming languages, e.g., those directed to simulation, may allow a node to produce an output without all inputs being present.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Note that in the descriptions provided herein, "data flow diagram" is a superset of "graphical data flow program". For example, an executable data flow diagram may be considered a graphical data flow diagram. It should be noted, however, that in some embodiments, a data flow diagram may not be executable, but merely illustrative. Note that as used herein, unless otherwise indicated, "graphical program" refers to a graphical data flow program, which is an executable (or interpretable) data flow diagram. Note further that in various embodiments, an executable data flow diagram may be run by interpreting the diagram at runtime, may be compiled to generate machine executable code, and/or may be converted to some other programming language, e.g., C or C++, then compiled and executed, as desired.

FIG. 1—Computer System

FIG. 1A illustrates a computer system 82 operable to perform embodiments of the methods disclosed herein, e.g., to efficiently convert a non-input bound data flow (NIBDF) diagram to an input bound data flow (IBDF) diagram. For example, the method may operate to receive a graphical program (a type of data flow diagram) configured to accommodate or support multiple models of computation, e.g., multiple data flow semantics, such as a program with a mixture of NIBDF and INDF nodes, and convert the NIBDF program or diagram to a homogeneous INDF program or diagram, i.e., where all the nodes are INDF nodes.

As shown in FIG. 1A, the computer system 82 may include a display device operable to display the data flow diagram as the data flow diagram is created and/or executed. The display device may also be operable to display a graphical user interface or front panel of the data flow diagram during execution of the data flow diagram. The graphical user interface may comprise any type of graphical user interface, e.g., depending on the computing platform.

The computer system 82 may include a memory medium(s) on which one or more computer programs or software components, according to one embodiment, may be stored. For example, the memory medium may store one or more graphical programs (or other types of programs) which are executable to perform the methods described herein. Also, the memory medium may store a graphical programming development environment application used to create and/or execute such graphical programs and/or data flow diagrams. The memory medium may also store operating system software, as well as other software for operation of the computer system. Various embodiments further include receiving or storing instructions and/or data implemented in accordance with the foregoing description upon a carrier medium.

Computer Network

Figure 1B:
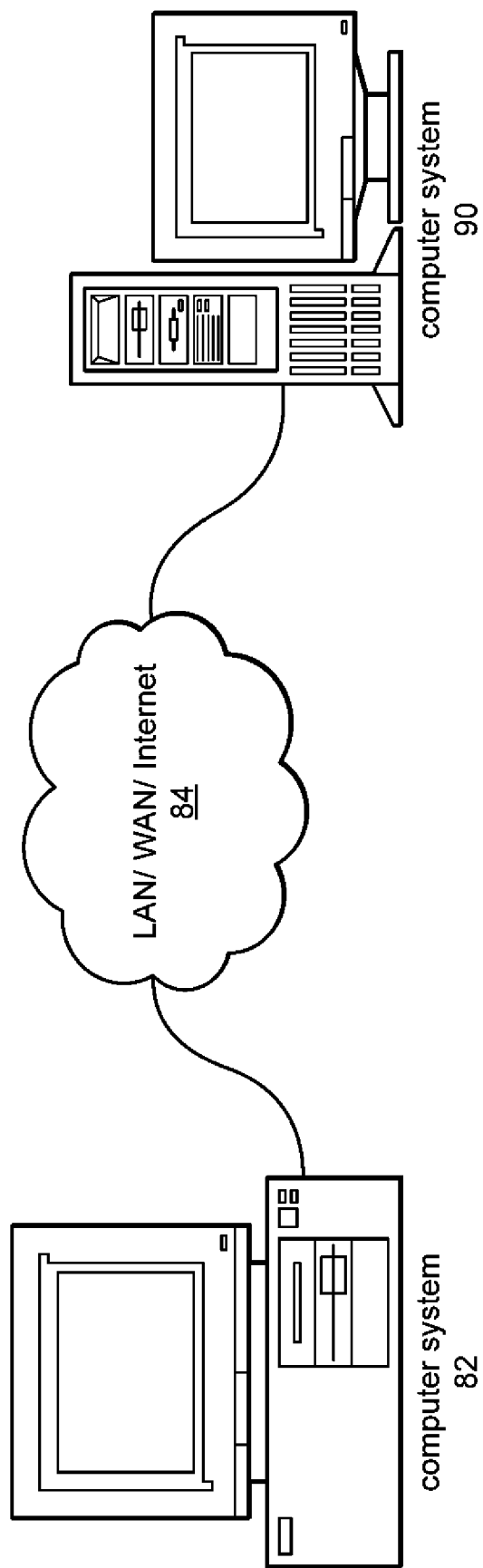
FIG. 1B illustrates a network system comprising two or more computer systems that may implement an embodiment.

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program or data flow diagram in a distributed fashion. For example, computer 82 may execute a first portion of the block diagram of a graphical program or data flow diagram and computer system 90 may execute a second portion of the block diagram of the graphical program or data flow diagram. As another example, computer 82 may display the graphical user interface of a graphical program or data flow diagram and computer system 90 may execute the block diagram of the graphical program or data flow diagram.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

Exemplary Systems

In some embodiments the methods described herein may involve performing test and/or measurement functions; controlling and/or modeling instrumentation or industrial automation hardware; modeling and simulation functions, e.g., modeling or simulating a device or product being developed or tested, etc. Exemplary test applications where the data flow diagram (e.g., graphical program) may be used include hardware-in-the-loop testing and rapid control prototyping, among others. It is noted that while the example of a data flow diagram in LabVIEW is presented as an example of a graphical data flow diagram having a non-input bound data flow model of computation (e.g., non-input bound data flow nodes) embedded within an input bound data flow model of computation (input bound data flow nodes), in other embodiments the models of computation may involve measurement and control of external signals and instrumentation interfaces.

However, it is also noted that various embodiments of the methods described herein can be used for a plethora of applications and are not limited to the above applications. In other words, applications discussed in the present description are exemplary only, and other embodiments may include various types of systems. Some examples include the control of other types of devices such as multimedia devices, video devices, audio devices, telephony devices, Internet devices, etc., as well as general purpose software applications such as word processing, spreadsheets, network control, network monitoring, financial applications, games, system analysis, etc.

Figure 2A:
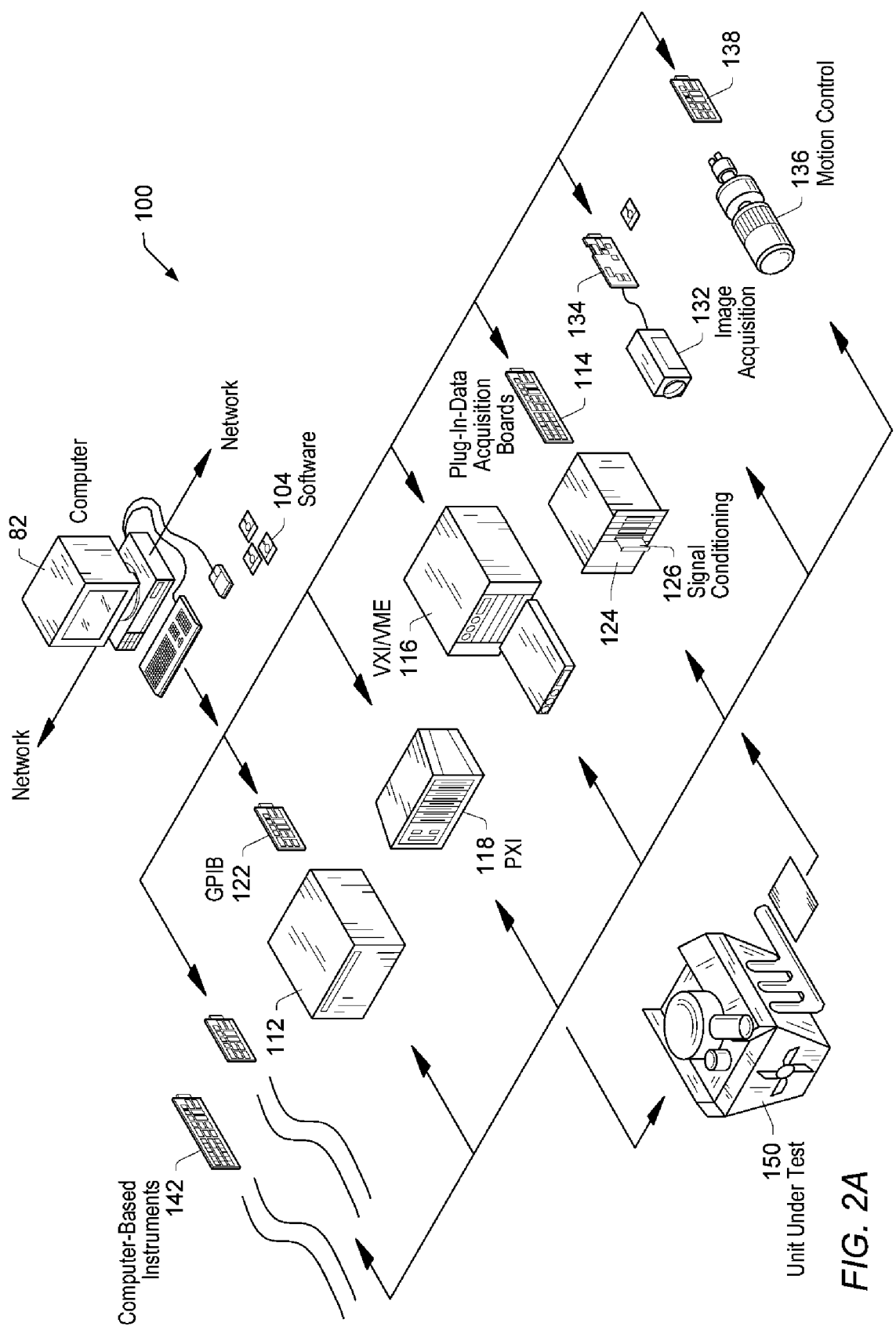
FIG. 2A illustrates an instrumentation control system according to one embodiment.

FIG. 2A illustrates an exemplary instrumentation control system 100 in one embodiment. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
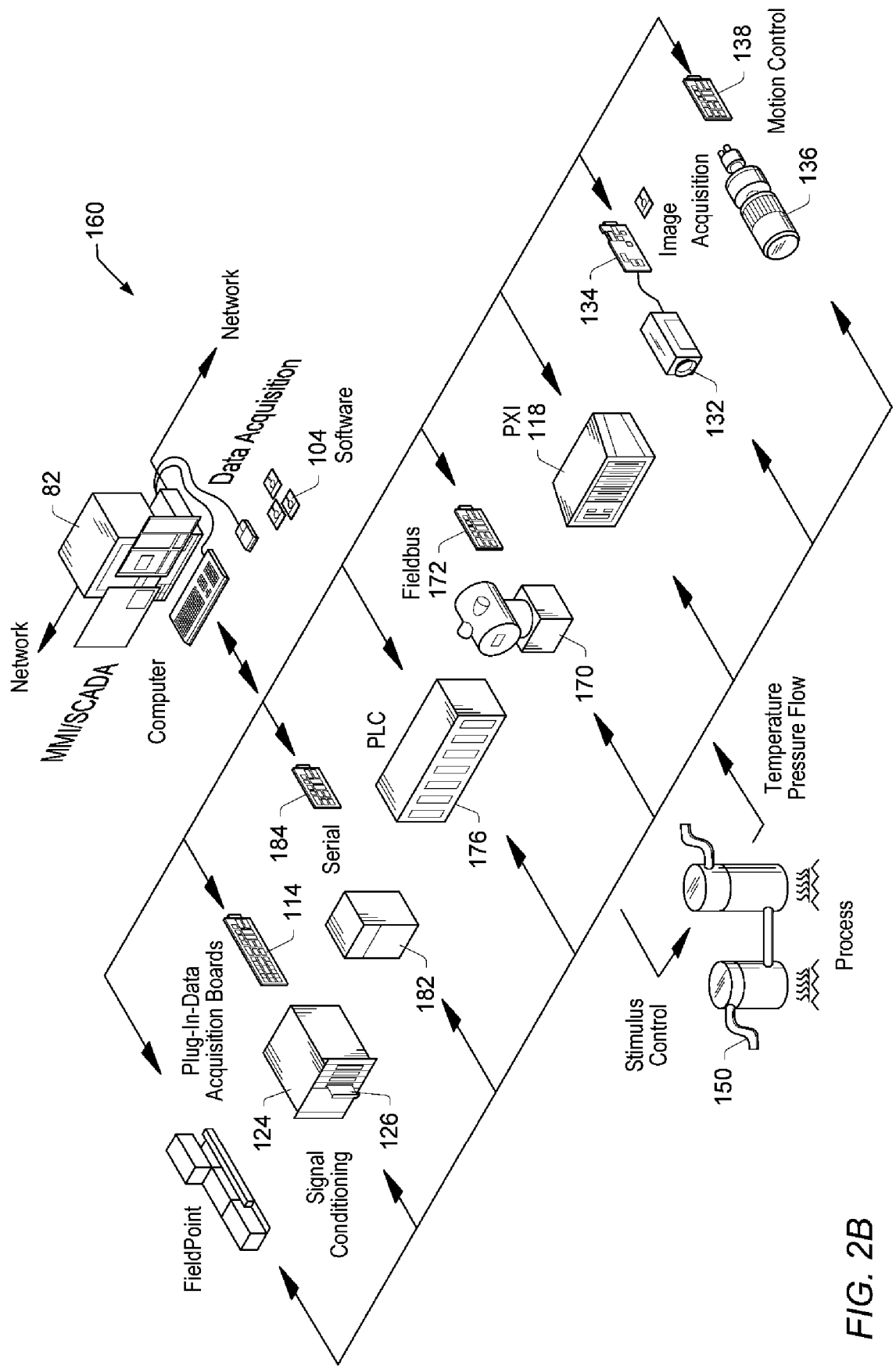
FIG. 2B illustrates an industrial automation system according to one embodiment.

FIG. 2B illustrates an exemplary industrial automation system 160 in one embodiment. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
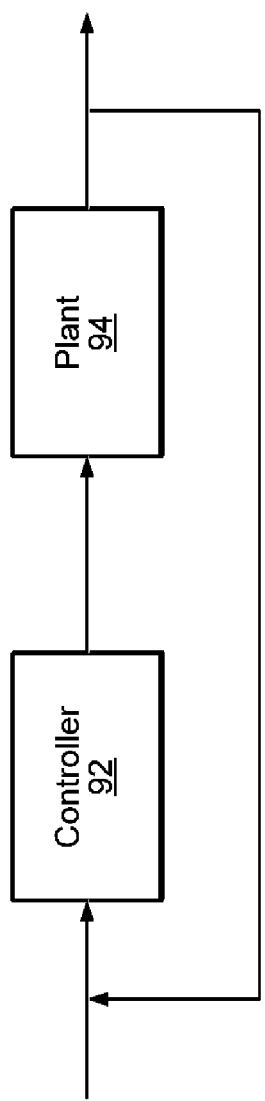
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
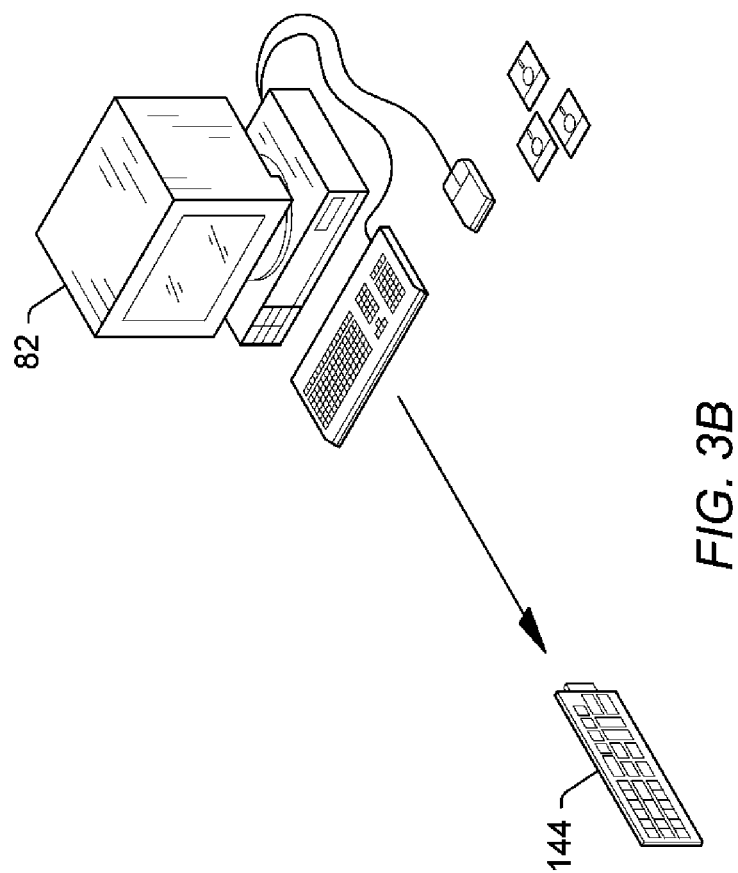
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a data flow diagram, e.g., a graphical program. In a similar manner, the plant 94 may be implemented by a computer system or other device 144 (e.g., including a processor and memory medium and/or including a programmable hardware element) that executes or implements a data flow diagram, e.g., a graphical program, or may be implemented in or as a real physical system, e.g., a car engine.

In one embodiment, one or more data flow diagrams, e.g., graphical programs, may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment, one or more data flow diagrams, e.g., graphical programs, may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a data flow diagram. Thus the user may create a data flow diagram on a computer and use (execute) the data flow diagram on that computer or deploy the data flow diagram to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Computer System Block Diagram

Figure 4:
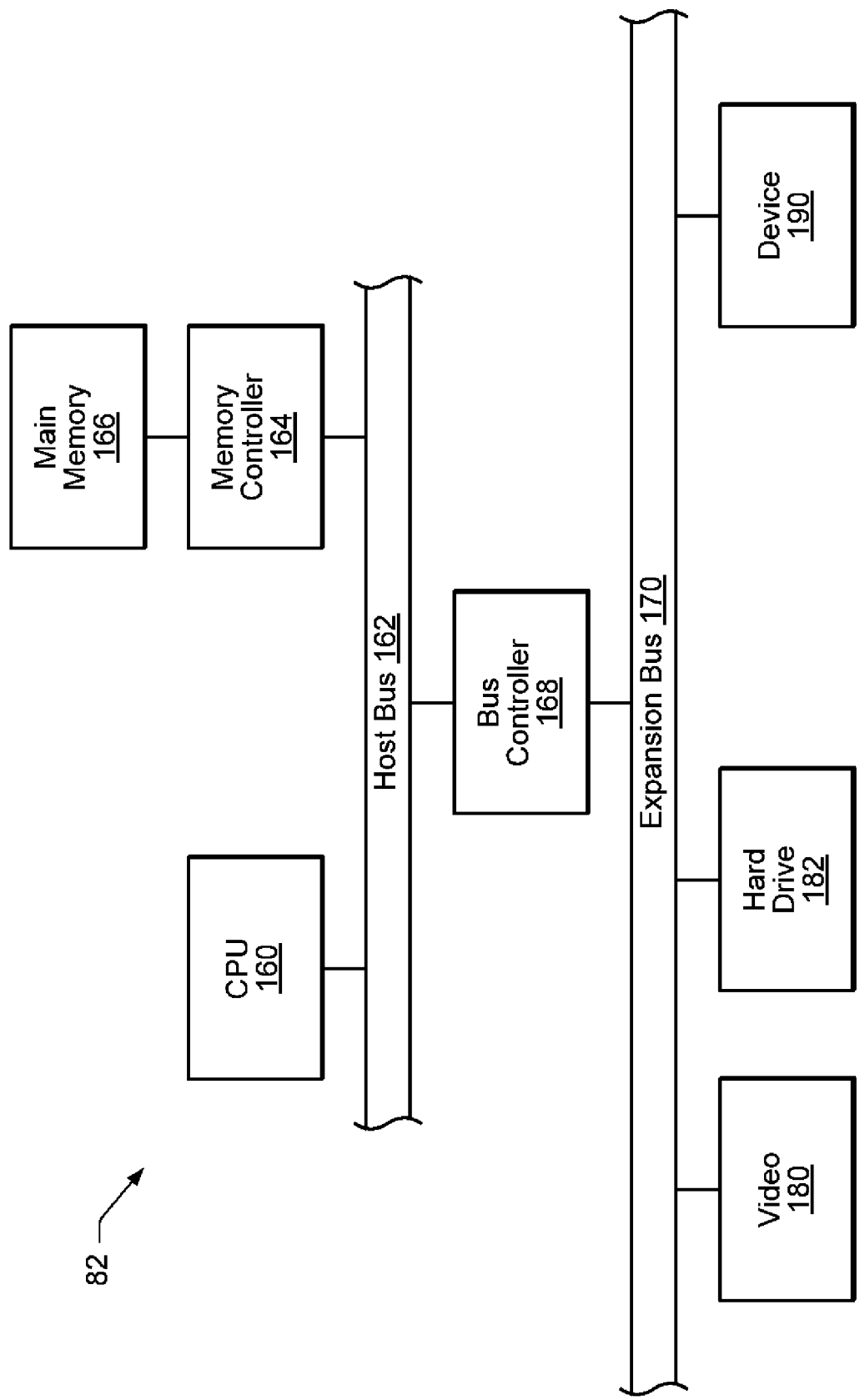
FIG. 4 is an exemplary block diagram of the computer systems of FIGS. 1A, 1B, 2A and 2B and 3B.

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the data flow diagram, e.g., that may include multiple data flow semantics, or that may not be a homogeneous input bound data flow diagram. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a data flow diagram, e.g., a graphical program, to the device 190 for execution of the graphical program on the device 190. The deployed data flow diagram may take the form of graphical program instructions or data structures that directly represents the data flow diagram. Alternatively, the deployed data flow diagram may take the form of text code (e.g., C code) generated from the data flow diagram. As another example, the deployed data flow diagram may take the form of compiled code generated from either the data flow diagram or from text code that in turn was generated from the data flow diagram.

Simulation Diagrams

Simulations are an important application for graphical programming, which as noted above, are used increasingly in test, design, and control applications. Simulations may require non-homogenous models of computation or data flow semantics for execution. In simulations implemented with data flow diagrams, data flow diagram elements often represent respective components and/or sub-processes of a system or process. The data flow diagram elements, also referred to as nodes, in a simulation may require or at least substantially benefit from features or behaviors not supported by some graphical programming systems. Thus, a simulation diagram may refer to a data flow diagram that can include at least one node or sub-diagram that is non-input bound.

For example, as noted above, the standard LabVIEW development environment (including the G graphical programming language) operates according to an input bound data flow model of computation or semantics. However, in many simulations, different components or processes may behave in such a way that the nodes representing these components or processes may need to operate according to a non-input bound data flow model of computation or semantics. Note that while the below is directed to simulation diagrams, nodes, and subsystems, the techniques presented are applicable to other diagrams, nodes, and subsystems, as well, simulations being but an exemplary application of one embodiment of the invention. In other words, the management and conversion process described herein with respect to simulation diagrams, nodes, and subsystems with non-input bound data flow semantics may be applied to other diagrams, nodes, and subsystems with non-input bound data flow semantics in a similar manner.

In some applications, both models of computation may be needed, such as, for example, in a control application that includes a simulation of the process or system being controlled. In this example, an input bound data flow model of computation (or input bound data flow semantics, such as with G graphical program code) may be used to implement control functionality, while a non-input bound data flow model of computation (such as with simulation nodes) may be used to implement the simulation portion of the application. In one embodiment, a first plurality of nodes, e.g., graphical program or data flow diagram elements, may comprise a simulation diagram, where at least a subset of the first plurality of graphical program elements includes non-input bound data flow nodes, and where the simulation diagram implements a simulation model, as described above.

The simulation diagram may utilize a set of semantics and execution properties that differ from an ordinary LabVIEW data flow diagram. Some differences between simulation diagrams and LabVIEW diagrams may include one or more of the following:

Feed-through information—A node in a simulation diagram (e.g., a simulation sub-diagram) may require only a subset of its inputs in order to compute any given output. The set of inputs required to compute a given output are said to feed that output directly, or to have "direct feed-through" to the output. Inputs not required to compute that output have "indirect feed-through". Said another way, direct feed-through refers to a property of a graphical program element where all of the inputs to the graphical program element must be present or valid for the graphical program element to fire or execute, whether or not each of the outputs for the graphical program element requires all of the inputs, as is the case, for example, with LabVIEW diagram nodes, which are input bound data flow nodes. In contrast, indirect feed-through refers to a property where the graphical program element generates an output as soon as the inputs needed for that output are present, for example simulation diagram nodes. Thus, indirect feed-through nodes are non-input bound data flow nodes.

The semantics for the simulation diagram may specify that a node may fire any given output as soon as it has received the inputs that have direct feed-through to the output. (Note that this is a key difference from the LabVIEW (IBDF) diagram, which specifies that all inputs must be received before any output may be fired.) Thus, it may be necessary for the simulation diagram to have access to feed-through information for each node. Although existing node types in LabVIEW may retain their existing behavior when placed in a simulation diagram (i.e. that all inputs have direct feed-through to all outputs), the simulation diagram may preferably recognize various simulation primitives and simulation subsystems that may have indirect feed-through from inputs to outputs.

Thus, in various embodiments, the simulation nodes may support direct feed-through and indirect feed-through for inputs and outputs of the simulation nodes. In other words, in some embodiments, at least one of the simulation nodes may comprise a plurality of inputs and a plurality of outputs, where a first output of the plurality of outputs requires only a subset of the plurality of inputs, and where the least one of the simulation nodes is operable to fire upon reception of the subset of the plurality of inputs to generate the first output.

In one embodiment, a feed-through mapping of inputs to outputs for the simulation nodes may be computed and stored. The computed feed-through mapping may be useful in converting graphical code with one data flow semantics, e.g., non-input bound data flow semantics, to graphical code with another data flow semantics, e.g., input bound data flow semantics, as described in detail below.

Feedback cycles—Cycles may be allowed between outputs and inputs of a node in the simulation diagram that do not feed directly to each other. Thus, in one embodiment, at least one of the simulation nodes may support a feedback cycle between an output of the simulation node and an input of the simulation node, e.g., an explicit feedback loop. For example, in one embodiment, at least one simulation node of the simulation nodes may support a feedback cycle between an output of the simulation node and an input of the simulation node if the input of the simulation node has indirect feed-through to the output of the simulation node, and/or if the input of the simulation node corresponds to a different iteration than the output of the simulation node. In other words, in this embodiment, an explicit feedback loop from the output to the input of the node may be supported as long as the input is not directly required by the output, and/or as long as the input and the output are not for the same iteration. Note that cycles are not permitted in the G-language syntax used for LabVIEW diagrams.

Placement of Simulation diagrams—In one embodiment, simulation diagrams may exist only as a root-level diagram of a simulation loop or a simulation subsystem (both described below).

In one embodiment, one or more simulation parameters for the simulation diagram may be configured and stored, where the configured one or more simulation parameters specify operation of the simulation diagram. In other words, the one or more simulation parameters may determine the behavior of the simulation diagram subject to constraints imposed by the input bound data flow semantics.

In one embodiment, one or more of the simulation nodes may comprise simulation primitives, i.e., simulation nodes that do not represent a sub-simulation diagram. Simulation primitives may preferably only be placed in a simulation diagram, and may have indirect feed-through properties as mentioned above. Key differences between simulation primitives and standard LabVIEW primitives may include:

Diagram placement—Simulation primitives may only be placed in a simulation diagram, while LabVIEW primitives may be used in standard LabVIEW block diagrams, and in some cases may be used in a simulation diagram.

Execution—A simulation primitive node may execute and outputs can fire before all inputs are received.

Cycles—Cycles may be allowed between non-direct feed-through terminals on a simulation primitive.

The types of nodes in a block diagram that includes a simulation diagram may include functional nodes (G-language nodes); direct simulation primitives (also referred to as direct API blocks); and indirect simulation primitives (also referred to as indirect API blocks). The direct simulation primitives are functional primitives which behave the same as their G-language counterparts, e.g., unary simulation functions. Indirect simulation primitives represent functions which may exhibit indirect feed-through, as described above. Note that the direct and indirect API block designation refers to the specific application programming interface that was developed for simulation diagrams. Thus, a node may be a primitive node, i.e., an API block, may be a subsystem node, which, being a non-input bound node, represents a non-input bound sub-diagram, or a subVI, which, being an input bound node, represents an input bound sub-diagram.

Note that in control block diagrams, the graphical program elements or nodes may be referred to as "blocks". In one embodiment, the simulation primitives may comprise a diverse control block diagram blockset, and may incorporate a number of features that are beyond the capabilities of standard LabVIEW subVIs. For example, some simulation blocks (e.g., an integrator block) may have inputs that do not directly feed outputs. Examples of blocks include integrators, transfer functions, look-up tables, and gain blocks, among others.

Some of the extended abilities that may be supported by simulation primitives may include one or more of configuration pages, dynamic icons, growing icons, N-ary operations, numeric polymorphism (e.g., both in terms of data type and/or dimensionality), custom pop-up menu commands, reversed block orientation, and terminal feed-through mappings, among others.

Although simulation primitives are generally "atomic", in that they do not represent a sub-simulation diagram, also referred to as a simulation subsystem, objects that access hidden simulation data may also be considered fundamental objects, and may be treated specially. For example, these objects may appear to the user as "primitives", and users may not be able to view the implementation directly from the simulation diagram. (In some embodiments, the generated code behind the objects may be made viewable, however.)

Simulation Subsystems

In certain complex simulations, the requirements of the mathematical computations implementing the simulation algorithm may be quite complex. Implementing a simulation diagram for a complex simulation may not be advantageous. Therefore, embodiments of a modular hierarchical usage of simulation diagrams as simulation subsystems are described.

In one embodiment, at least one of the simulation nodes represents a sub-simulation diagram, referred to as a simulation subsystem, where the sub-simulation diagram may comprise two or more additional simulation nodes. In other words, a simulation node may represent a plurality of additional simulation nodes, and thus may encapsulate a sub-simulation diagram.

In one embodiment, simulation subsystems implement sub-models, i.e. to hierarchically package portions of a simulation diagram in a modular form, e.g., as a node within a simulation diagram. The graphical implementation may be considered analogous to a subVI node in LabVIEW. To the user, a simulation subsystem may appear as a node whose root diagram is a simulation diagram, and may be placed (in LabVIEW subVI fashion) in a simulation diagram. When placed in a simulation diagram, these subsystems execute as if inlined in the simulation diagram and may execute elements of their diagram as inputs become available, with indirect feedthrough. Thus, simulation subsystems may provide a graphical shorthand, i.e., a way to group code elements together into a single icon and reduce the complexity of simulation diagram code. Some differences between simulation subsystems and LabVIEW subVIs may include one or more of the following:

Diagram placement—Simulation subsystems may only be used in a simulation diagram, while LabVIEW primitives may be used in standard LabVIEW block diagrams, and in some cases may be used in a simulation diagram.

Execution—When run as a free-standing VI, the simulation subsystem may execute its diagram as if it were contained within a simulation loop, thereby allowing the user to test and debug the diagram in isolation, e.g., without having to be enclosed in a simulation loop. When run in a simulation loop, e.g., as part of a larger data flow diagram, simulation subsystems may execute as if inlined, i.e. elements in the diagrams may execute as individual inputs become available.

Connection Feed-through—In addition to storing data types for inputs and outputs, the simulation subsystems may compute and store a feed-through mapping of inputs to outputs, e.g., for the additional simulation nodes comprised in the sub-simulation diagram.

Simulation Parameters—Simulation subsystems store default simulation parameters for their respective simulation diagrams for use when they are run as free-standing systems. However, when embedded in another simulation diagram (a parent diagram), the subsystems may inherit parameter values from the parent diagram.

Thus, in one embodiment, one or more simulation parameters for the sub-simulation diagram may be configured and stored, where the configured one or more simulation parameters specify operation of the sub-simulation diagram. In a preferred embodiment, the two or more additional simulation nodes (in the sub-simulation diagram) are operable to execute in the simulation diagram in an inlined manner. Thus, the simulation subsystem (node) may utilize the feed-through mapping for simulation nodes comprised in the simulation subsystem's sub-simulation diagram to execute the simulation nodes appropriately, e.g., with indirect feed-through, as described above.

Compilation of a Simulation Diagram

In order to execute the code defined by a simulation diagram (or other data flow diagram), some form of executable code must be generated, e.g., via an interpreter at runtime, or a compiler. In the presently described methods, a simulation diagram may be converted into a LabVIEW data flow diagram, which may then be compiled (or interpreted) into a form that may be executed by a microprocessor. In one embodiment, a companion data flow diagram may be coupled to or associated with the simulation diagram, where the companion data flow diagram executes in lieu of, or in conjunction with, the simulation diagram. In one embodiment, the companion diagram, its automatic generation, (optional) compilation, and storage, are all kept hidden from the user of the simulation diagram, such that the companion diagram actually represents the executable code for the algorithm defined by the simulation. As described in U.S. patent application Ser. No. 10/869,572, a simulation diagram representing code with a first data flow semantic (or more generally, a first model of computation), may be converted into LabVIEW code with a second data flow semantic (or more generally, a second model of computation). Thus, for example, a simulation diagram representing a non-input bound data flow model of computation may be converted or reduced to a collection of elements in a LabVIEW diagram, which executes according to an input bound data flow model of computation. Although the actual execution occurs with input bound data flow, the functionality of the executed code is equivalent to the non-input bound data flow specified in the simulation diagram; the conversion process creates all necessary elements and structures required for a correct conversion that executes the desired simulation functionality.

In one implementation, the companion diagram is automatically generated and compiled when the simulation diagram is executed or saved. In one embodiment, the term pre-conversion may refer to the state of a simulation diagram which has not been converted, i.e. the companion diagram has not been generated for it yet. The term post-conversion may refer to the state of a simulation diagram when the companion diagram has been generated, and optionally compiled. The term "dirty" may refer to the state of a companion diagram which has either not been converted at all or a state in which is it not consistent with what is represented on the simulation diagram; for example, after conversion, if functional changes (i.e., additions, amendments, deletions) are made to the simulation diagram, then the companion diagram may be set to the 'dirty' state. In other words, the "dirty" state indicates that the companion diagram is not up to date with respect to the simulation diagram. Note that while the simulation diagram may include non-input bound data flow nodes or subsystems, the companion diagram, when up to date, is an input bound data flow diagram, where all nodes are input bound data flow nodes.

As noted above, the simulation diagrams described above are exemplary versions of non-input bound data flow diagrams, and the methods and techniques described herein are broadly applicable to diagrams with non-input bound elements are architectures, and are not limited to simulation diagrams.

Figure 5:
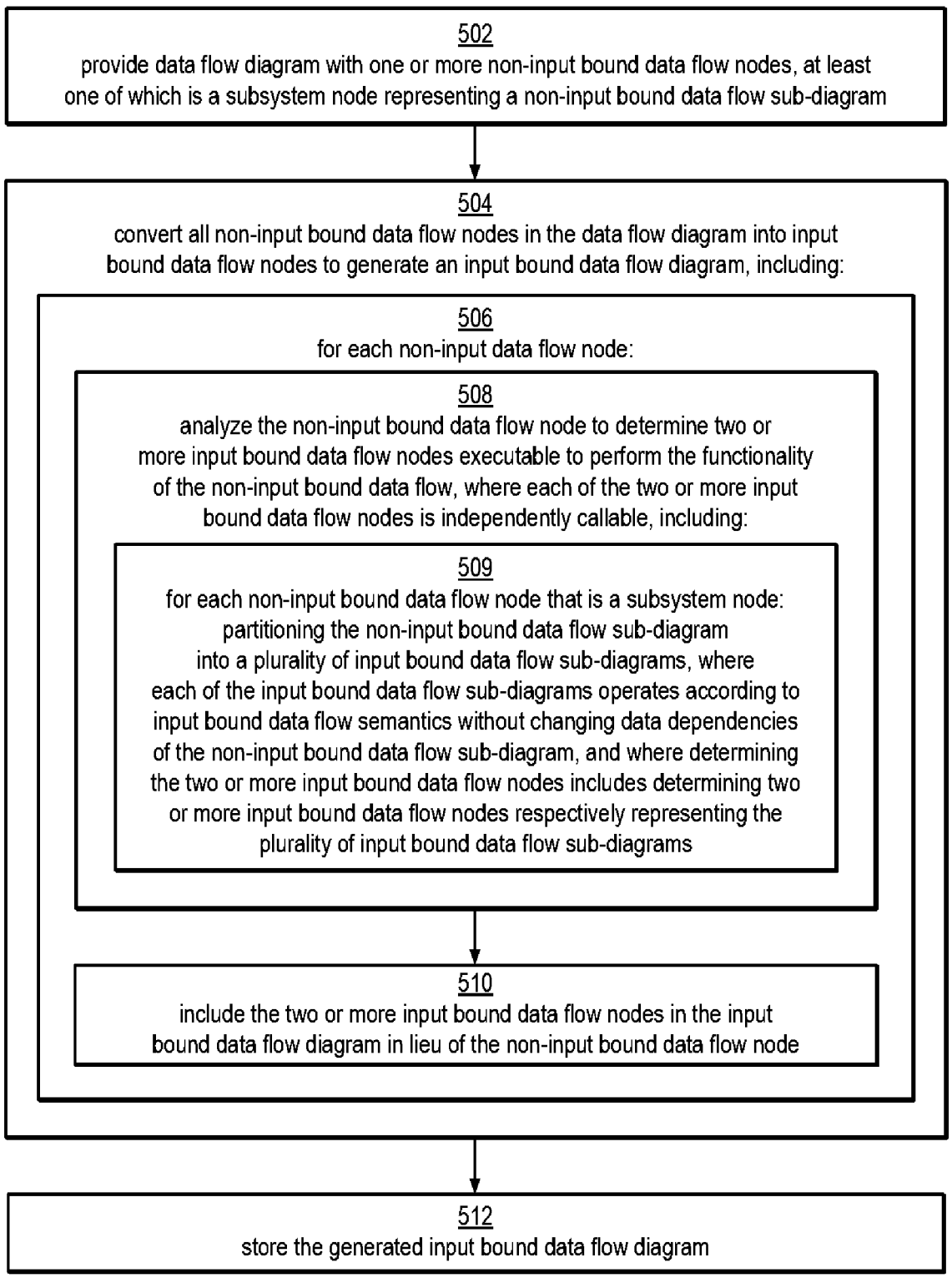
FIG. 5 is a flowchart diagram illustrating one embodiment of a method for generating a homogeneous input bound data flow diagram from a non-input bound data flow diagram, according to one embodiment.

FIG. 5—Method for Generating a Data Flow Diagram

FIG. 5 is a high-level flowchart of a method for generating a data flow diagram, according to one embodiment. In various embodiments, one or more of the method elements described may be performed concurrently, in a different order than shown, or may be omitted. Additional steps may also be performed as desired. The method shown in FIG. 5 may be used in conjunction with any of the computer systems or devices shown in the above figures, among other devices. As shown, this method may operate as follows.

In 502, a data flow diagram may be provided. The data flow diagram may be received from an external system, e.g., over a network, retrieved from memory, or developed by the user. The data flow diagram may include one or more non-input bound data flow nodes, each with a respective functionality. At least one non-input bound data flow node in the data flow diagram is a subsystem node representing a non-input bound data flow sub-diagram that includes a plurality of interconnected nodes. Note that, as described above, the non-input bound data flow sub-diagram may be a non-input bound data flow entity because it includes at least one non-input bound data flow node, or the sub-diagram may only include input bound data flow nodes, but still be a non-input bound data flow entity because of its structure, i.e., its topology.

In 504, all non-input bound data flow nodes in the data flow diagram may be converted into input bound data flow nodes to generate an input bound data flow diagram, i.e., a data flow diagram that includes no non-input bound data flow nodes. As FIG. 5 indicates in 506, the conversion may include processing each non-input bound data flow node in the data flow diagram, as described below with reference to 508-510.

In 508, the non-input bound data flow node may be analyzed to determine two or more input bound data flow nodes executable to perform the functionality of the non-input bound data flow, where each of the two or more input bound data flow nodes is independently callable, i.e., two or more input bound data flow nodes are independent. Moreover, as indicated in 509, for each non-input bound data flow node that is a subsystem node, the analyzing may include partitioning the non-input bound data flow sub-diagram into a plurality of input bound data flow sub-diagrams, where each of the input bound data flow sub-diagrams operates according to input bound data flow semantics without changing data dependencies of the non-input bound data flow sub-diagram, and where the determining the two or more input bound data flow nodes includes determining two or more input bound data flow nodes respectively representing the plurality of input bound data flow sub-diagrams.

Thus, input bound data flow nodes may be determined that correspond to the non-input bound data flow node.

In some embodiments, the determining of the two or more input bound data flow nodes may include: if any of the two or more input bound data flow nodes have not already been created, the method may include creating the input bound data flow nodes that have not already been created based on the functionality of the non-input bound data flow node, and storing the created input bound data flow nodes, and if any of the two or more input bound data flow nodes have already been created, the already created input bound data flow nodes may be retrieved. In some embodiments, creating the two or more input bound data flow nodes may be performed automatically, while in other embodiments, creating the two or more input bound data flow nodes may be performed manually, e.g., by a user specifying or creating the node in a graphical programming development environment.

In 510, the two or more input bound data flow nodes may be included in the input bound data flow diagram in lieu of the non-input bound data flow node. In other words, the determined two or more input bound data flow nodes placed or inserted into the input bound data flow diagram in instead of the non-input bound data flow node.

Finally, in 512, the generated the input bound data flow diagram may be stored, e.g., in a memory medium. Note that the input bound data flow diagram is characterized by an input bound data flow model of computation, since no non-input bound data flow nodes remain in the converted/generated diagram. It is still possible, however, that some subsets of the diagram may have non-input bound data flow behavior, but such behavior is due to the architecture or arrangement of the nodes, not due to the nodes themselves.

Note further that because of the partitioning and determining of nodes representing the input bound data flow sub-diagrams, i.e., representing the partitions of 509 above, the number of (input bound data flow) nodes in the generated diagram is less than would be the case were the input bound data flow sub-diagrams left as is. Thus, while the respective replacement of non-input bound data flow nodes with respective two or more input bound nodes may substantially increase the total number of nodes in the diagram, the partitioning and substituting of input bound data flow nodes for the input bound data flow sub-diagrams serves to ameliorate this increase in total number of nodes.

In some embodiments, the conversion of 504 may be automatic. In other words, the analyzing and including may be performed automatically, e.g., via execution of program instructions. However, in other embodiments, at least some user input may be required to perform some of the method elements described.

Further Embodiments

In some embodiments, the non-input bound data flow sub-diagram of 509 may initially include at least one non-input bound data flow node, in which case analyzing the non-input bound data flow node may further include performing the analyzing and including for each non-input bound data flow node in the non-input bound data flow sub-diagram. In other words, these nodes in the sub-diagrams may also be converted in the same manner, prior to the partitioning of the sub-diagram. More generally, the data flow diagram may be hierarchical, with sub-diagrams at any of various levels.

Figure 6A:
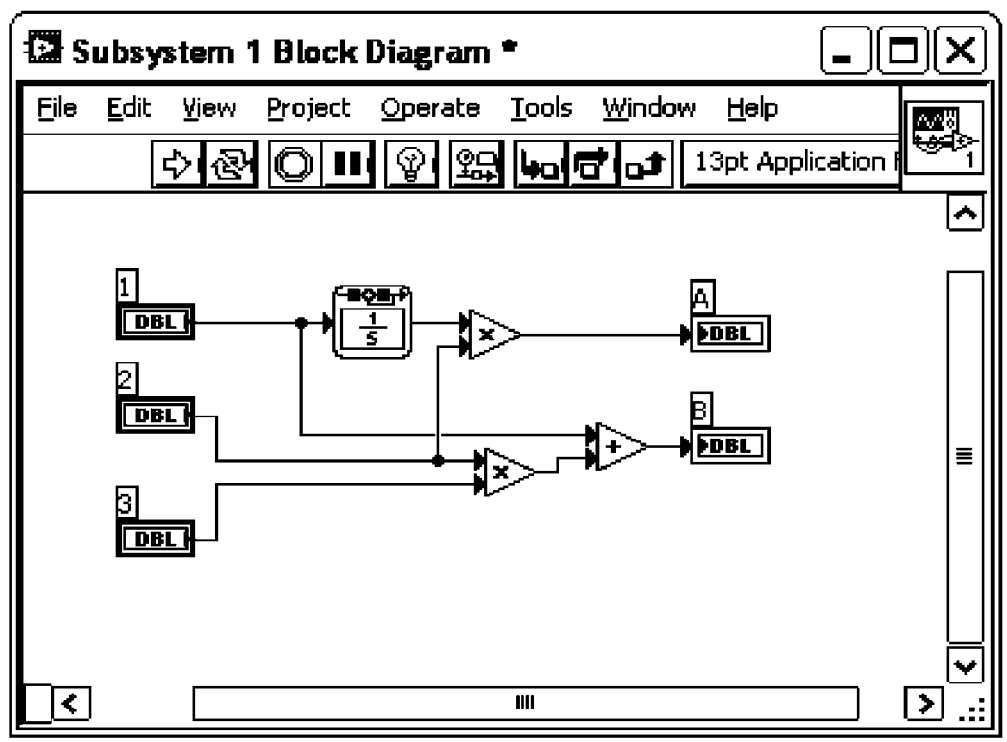
FIGS. 6A-6E are exemplary screenshots illustrating partitioning of a subsystem diagram of a non-input bound data flow node, according to one embodiment.

FIG. 6A is an exemplary screen shot of a subsystem node's sub-diagram, i.e., a subsystem diagram represented by a non-input bound data flow node in a calling diagram one level above the sub-diagram. As FIG. 6A shows, the subsystem diagram has three inputs, labeled "1", "2", and "3" (left side of the diagram), and two outputs, labeled "A" and "B" (right side of diagram), as well as three (triangular) arithmetic nodes, including two multiplication nodes, labeled "x", and an addition node, labeled "+", and a rectangular non-input bound data flow node, labeled "1/s". Thus, the subsystem diagram (sub-diagram) of FIG. 6A is a non-input bound sub-diagram from an expanded non-input bound data flow node from one level up in the hierarchy of the data flow diagram. Moreover, this subsystem diagram itself includes a non-input bound data flow node, which, per the above, may be replaced with two or more input bound data flow nodes.

Figure 6B:
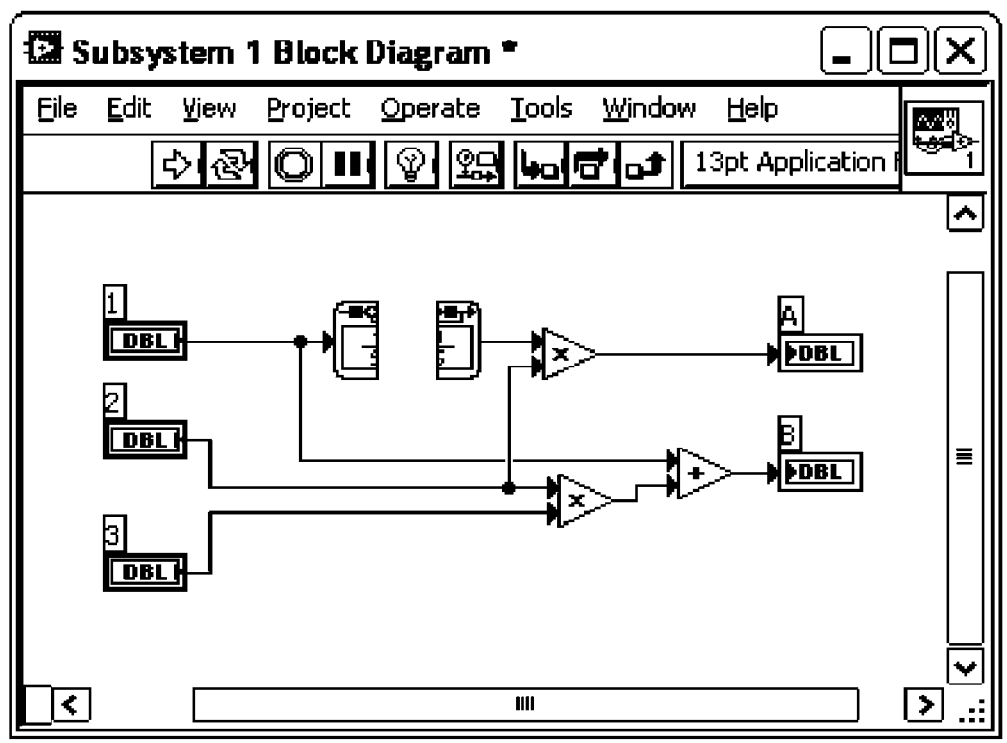

FIG. 6B illustrates an exemplary screenshot of the sub-diagram of FIG. 6A, but where the non-input bound data flow node has been "chopped", or partitioned, into two parts. Note that in this exemplary embodiment, rather than showing breaking out the node into a sub-diagram first, then partitioning the sub-diagram, and representing each partition with a respective input bound data flow node, the non-input bound data flow node has simply been shown replaced with two input bound data flow nodes, each of which displays a respective half of the original node's icon, although such breaking out and partitioning may have been performed "behind the scene". The result, as indicated, is that the sub-diagram now includes only input bound data flow nodes. However, note that while all the nodes in the sub-diagram are now input bound data flow nodes, the sub-diagram itself may still be non-input bound, e.g., due to the arrangement and connectivity of the nodes.

As described above in 509, the analyzing of 508 may include partitioning the non-input bound data flow sub-diagram into a plurality of input bound data flow sub-diagrams, where each of the input bound data flow sub-diagrams operates according to input bound data flow semantics without changing data dependencies of the non-input bound data flow sub-diagram.

In preferred embodiments, the partitioning of 509 may be performed based on input and output data dependencies of the interconnected nodes of the non-input bound data flow sub-diagram. Thus, in order to avoid introducing new data dependencies, nodes may be grouped into portions or partitions of the sub-diagram, according to their dataflow dependencies. For example, nodes have a dataflow dependence on the input to a subsystem (sub-diagram) if there is a direct dataflow path between the input to the subsystem and an input to the node. An output of the subsystem has a dataflow dependency on a node if there is a direct dataflow path between an output of the node and the original output of the subsystem. Once these dataflow dependencies are computed, nodes that depend on the same set of subsystem inputs may be grouped together. Alternatively, nodes on which the same set of subsystem outputs depend may be grouped together. In one embodiment, both strategies for grouping nodes into clumps may be used, and the strategy which results in the fewest partitions chosen.

Figure 6C:
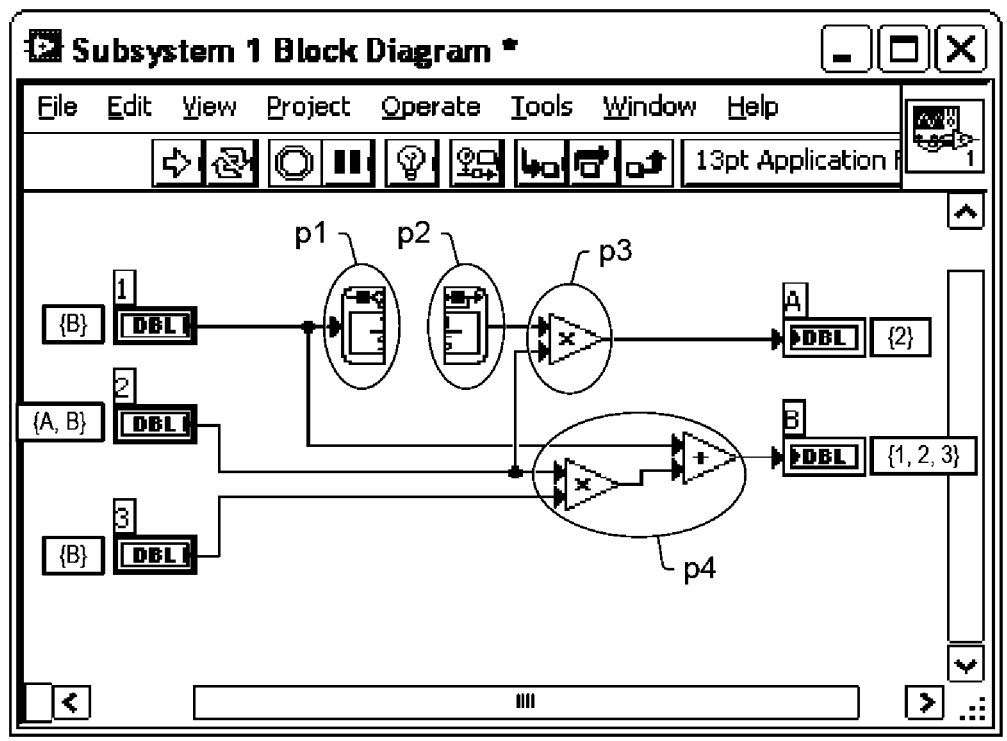

FIG. 6C illustrates partitioning based on input dependencies of the nodes, according to one embodiment, where for each node a determination may be made as to what inputs must be present for the node to fire. Since each node is input bound, each input to the node acts like a gate for the other inputs, because none are used until all are present. Thus, as may be seen, the sub-diagram has been partitioned into partitions or "clumps" with distinct input dependencies. More specifically, partition p1 depends only on input 1, p2 has no inputs and so has no input dependency, p3 (comprising the top multiply node) depends on input 2, and p4 (comprising the bottom multiply node and the addition node) depends on inputs 1, 2, and 3. Note that these dependencies are also reflected in the I/O dependencies of the overall sub-diagram. For example, note that beside each input (1, 2, and 3), is displayed the outputs (A and/or B) that is ultimately dependent on that input, i.e., which outputs that input contributes to, and similarly, beside each output (A and B) is displayed the inputs ultimately contributing to that output, i.e., what inputs contribute to that output. Thus, input 1 contributes to output B, input two contributes to outputs A and B, and input 3 contributes to output B; and output A depends on input 2, and output B depends on inputs 1, 2, and 3.

Figure 6D:
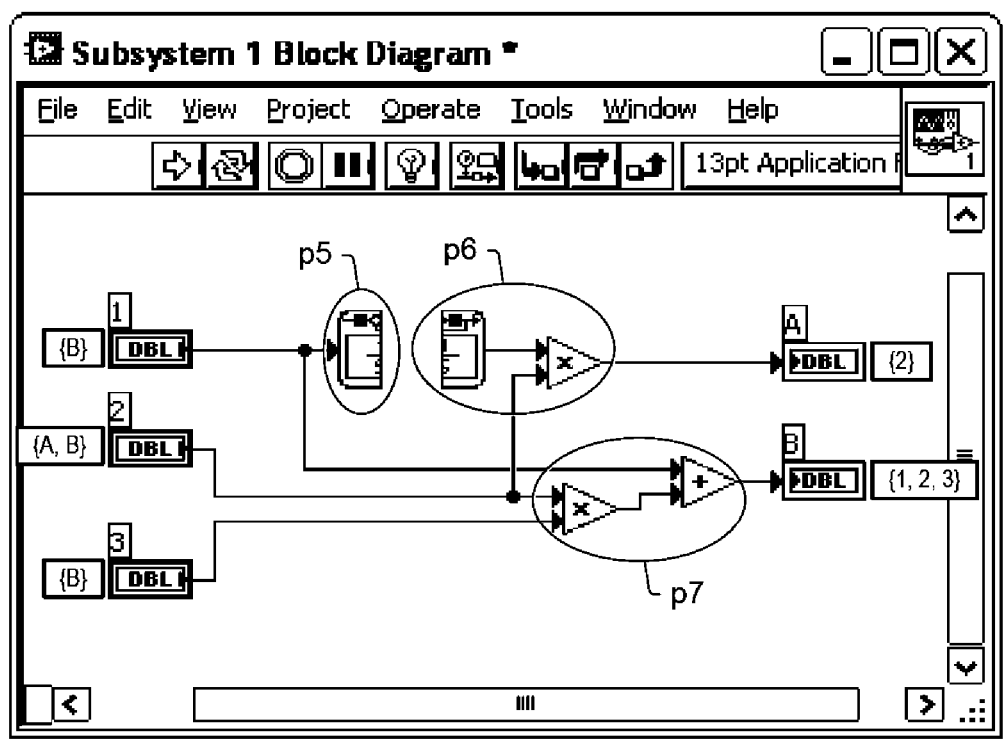

A similar analysis and partitioning may be performed based on output dependencies. FIG. 6D illustrates partitioning based on such output dependencies of the nodes, according to one embodiment, where for each node a determination may be made as to what outputs depend on the node firing. Similar to above, since each node is input bound, no output is produced until all contributing nodes have fired, and so each contributing node's output is effectively gated by the other contributing nodes. Thus, as may be seen, the sub-diagram has again been partitioned into partitions or "clumps", but this time based on distinct output dependencies. More specifically, partition p3 (comprising the left (input) half of the original non-input bound data flow node) contributes to no outputs, p6 (comprising the right (output) half of the original non-input bound data flow node and the top multiply node) contributes to output A, and p3 (comprising the bottom multiply node and the addition node) contributes to output B. As above, these dependencies are also reflected in the I/O dependencies of the overall sub-diagram. Thus, since the partitioning based on output dependencies (FIG. 6D) results in three partitions or clumps, rather than the four partitions or clumps of FIG. 6C based on input dependencies, the output dependency based approach may be used.

Figure 6E:
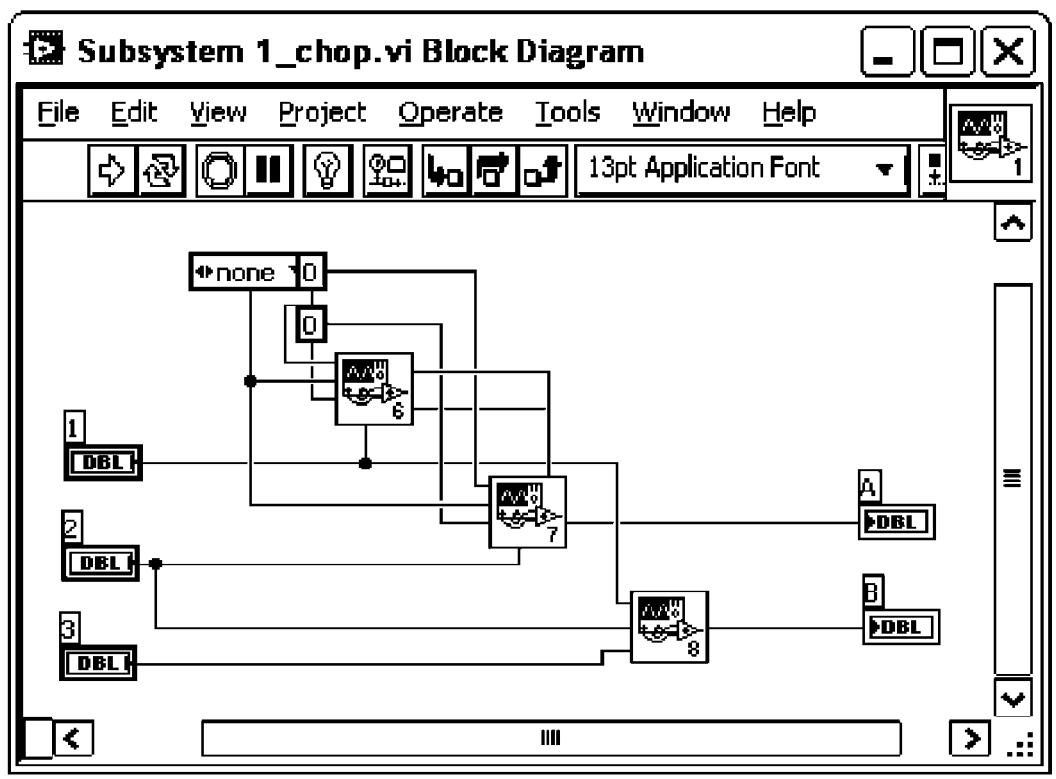

As described above, in some embodiments, the determining the two or more input bound data flow nodes includes determining two or more input bound data flow nodes respectively representing the plurality of input bound data flow sub-diagrams. FIG. 6E illustrates an exemplary screenshot of the subsystem diagram of FIGS. 6A-6D, but where the partitions (of FIG. 6D) have been replaced with respective input bound data flow nodes, labeled 6, 7, and 8, respectively. It should be noted that in some embodiments, the modified sub-diagram of FIG. 6E may not actually be stored as a separate diagram, but rather may be used in the data flow diagram everywhere instances of the original non-input bound data flow node occurred.

In some embodiments, a more sophisticated analysis of dependencies may result in a more efficient partitioning strategy. For example, in one embodiment, the partitioning may include computing a feed-through map for the non-input bound data flow sub-diagram indicating dependencies of each output of the non-input bound data flow sub-diagram upon inputs of the non-input bound data flow sub-diagram, and analyzing the feed-through map to determine at least two of the input bound data flow sub-diagrams that, if merged, would not produce any new data dependencies of the outputs of the non-input bound data flow sub-diagram upon inputs of the non-input bound data flow sub-diagram. The at least two of the input bound data flow sub-diagrams may then be merged. Note that such merging of input bound data flow sub-diagrams decreases the number of partitions, and thus the number of corresponding input bound data flow nodes needed to represent the input bound data flow sub-diagrams in the top-level diagram, i.e., the data flow diagram.

Given the strategy for grouping nodes into partitions above, the potential number of partitions may be reduced by reducing the number of inputs or outputs to the subsystem. This may be achieved by treating subsystem inputs or outputs which have the same dataflow dependencies as equivalent. That is, subsystem inputs with equivalent sets of dependent subsystem outputs can be treated as the same input for the purposes of the partitioning algorithm. Similarly, subsystem outputs which are dependent on equivalent sets of subsystem inputs may be treated as the same output. Such equivalencies may be determined via a feedthrough map.

Figure 7A:
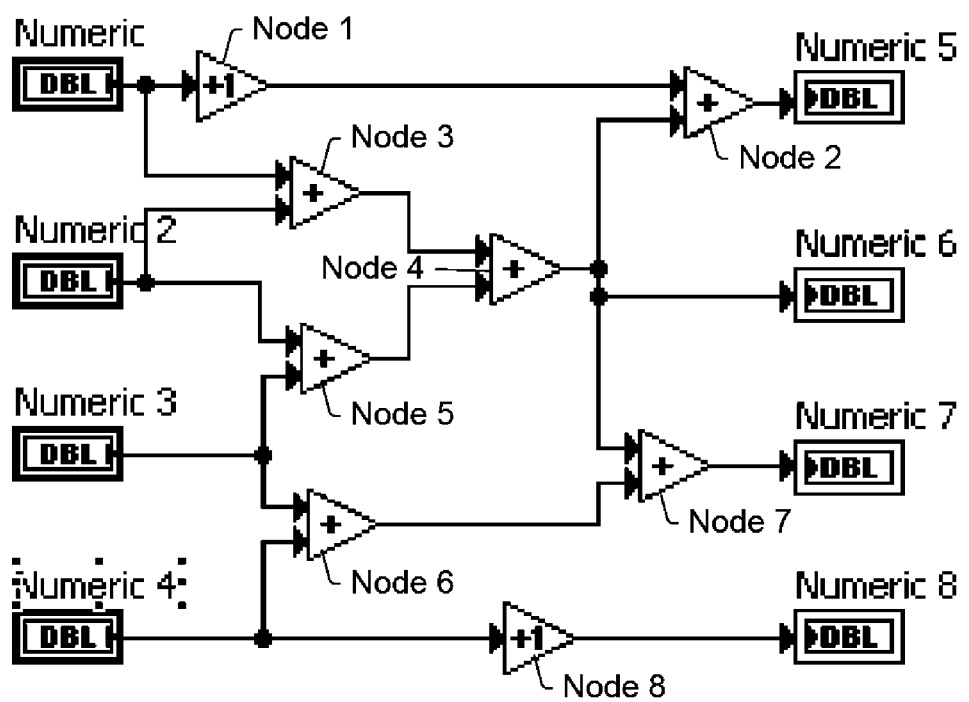
FIGS. 7A-7C illustrate use of a feedthrough map to perform partitioning of a sub-diagram, according to one embodiment.
Figure 7B:
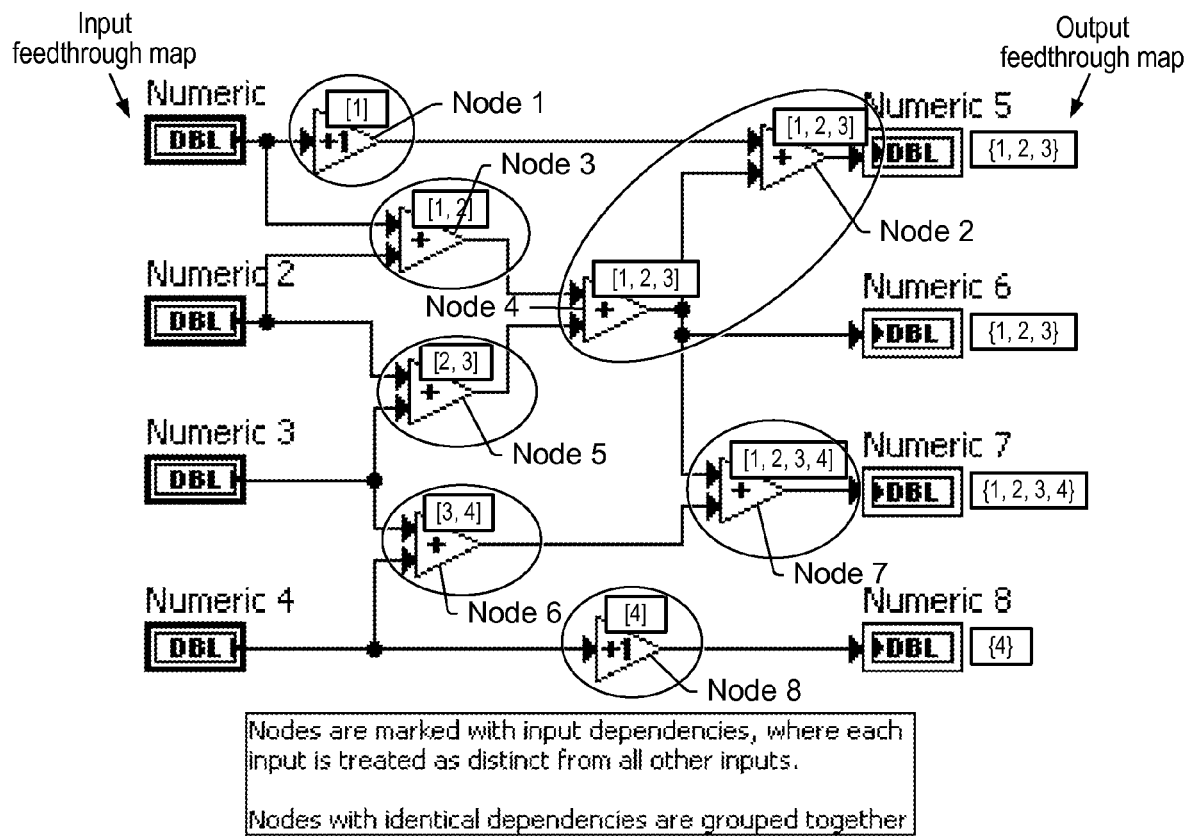
Figure 7C:
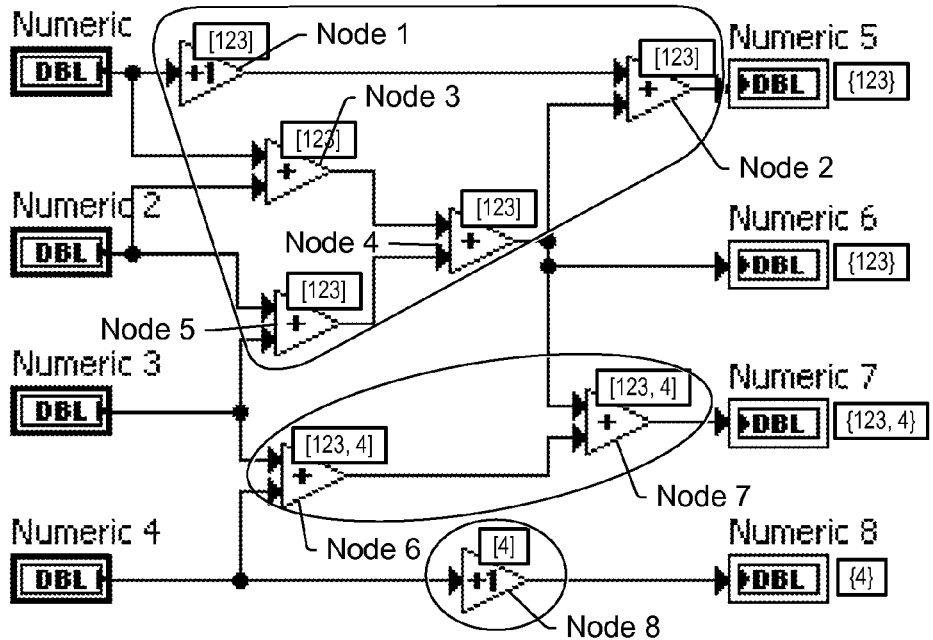

FIGS. 7A-7C illustrate use of a feedthrough map to perform partitioning of a sub-diagram, according to one embodiment. FIG. 7A illustrates an exemplary (simple) data flow diagram (or sub-diagram), with inputs 1-4 (labeled "Numeric n", where n=1, 2, 3, 4, with input 1 displayed in the top left of the diagram) feeding various nodes (Nodes 1-8, so labeled), which then produce outputs 5-8 (labeled "Numeric n", where n=5, 6, 7, 8).

FIG. 7B illustrates the data flow diagram of FIG. 7A, but with input and output dependencies denoted beside each input and each output. As may be seen, input 1 (Numeric 1) contributes to outputs 5, 6, and 7; input 2 contributes to outputs 5, 6, and 7; input 3 contributes to outputs 5, 6, and 7; and input 4 contributes to outputs 7 and 8. As FIG. 7B also indicates, output 5 (Numeric 5) depends on inputs 1, 2, and 3; output 6 (Numeric 6) depends on inputs 1, 2, and 3; output 7 (Numeric 7) depends on inputs 1, 2, 3, and 4; and output 8 (Numeric 8) depends on input 4. The dependencies are each feedthrough maps, and may be termed input and output feedthrough maps, respectively. Note that each provides the same information, but in a different, complementary form, and so one, e.g., the input dependencies of the outputs, may be derived from the other, e.g., the output feedthrough of the inputs (which outputs each input contributes to).

As shown, in this example, each node in the diagram has been marked with its respective input dependencies, i.e., the inputs received by the node and upon which the node depends to fire or execute. For example, Node 1 depends on input 1, indicated by the label "[1]". The nodes have been grouped together based on their respective input dependencies, where all nodes with identical input dependencies are grouped together, resulting in 7 partitions or clumps, as indicated by the closed curves enclosing each group. Note that this approach, which treats inputs as distinct, does not use a feedthrough map, and results in a relatively large number of partitions or clumps.

FIG. 7C illustrates the data flow diagram of FIG. 7A, but where the feedthrough map(s), i.e., the I/O dependencies, have been analyzed to determine dependencies that may be treated as equivalent with respect to the partitioning process. More specifically, in this embodiment, the input feedthrough map has been used to determine equivalent input dependencies, according to which the nodes are then grouped.

For example, referring back to FIG. 7B, note that inputs 1, 2, and 3 all contribute to the same outputs, specifically, outputs 5, 6, and 7. Thus, these inputs may be considered to be equivalent with respect to dependencies, in that all are needed to produce each of the outputs 5, 6, and 7. According to the convention used in these examples, since inputs 1, 2, and 3 have been determined to be equivalent, the individual input dependencies of the nodes in the diagram shown next to each node are modified by replacing each of the indicated inputs 1, 2, and 3, with the concatenated label "123" (and redundancies removed), indicating that these inputs (1, 2, and 3) are equivalent, as shown in FIG. 7C. Thus, the input dependency for Node 1, which in FIG. 7B was simply "[1]", is shown as "[123]" in FIG. 7C, and similarly for Nodes 2-5, since each depends on one or more of inputs 1, 2, and 3. Note that the feedthrough maps may also be modified in this manner. For example, in the output feedthrough map (on the right side of the diagram) the designations of inputs {1, 2, 3}, have been replaced with {123}. Similarly, since outputs 5 and 6 each have the same input dependencies, designations of outputs 5 and 6 may each be replaced with the concatenated label "56", as indicated in the input feedthrough map of FIG. 7C (left side of the diagram).

The last input, Input 4, which contributes to outputs 7 and 8, as indicated by the input feedthrough map to the left of the inputs, is singular, in that there are no other inputs that have the same output contribution (outputs 7 and 8). Thus, no further inputs may be grouped.

As FIG. 7C shows, the nodes may then be grouped by their (modified) input dependencies, i.e., nodes with identical input dependencies may be grouped together, thus partitioning the diagram. Thus, Nodes 1-5, each depending on input 123, are grouped together, Nodes 6 and 7, each dependent on inputs 123, and 4, are grouped together, and finally, node 8, dependent on input 4, is its own partition.

It should be noted that the diagram could also be partitioned based on equivalent outputs, which would produce a similar, although possible different partitioning. Note the drastic reduction in subdiagrams or partitions from the partitioning of FIG. 7B and that of FIG. 7C. As described above, these partitions may then be represented by respective nodes. Also note that the ultimate dependencies of the outputs on the inputs does not change with the partitioning. In other words, partitioning or clumping the nodes in the manner described does not change the input/output dependencies of the diagram (or sub-diagram).

In preferred embodiments, the conversion of non-input data flow nodes to input bound data flow nodes may include performing the partitioning and including for each non-input bound data flow subsystem node in the data flow diagram in a recursive manner. In various embodiments, this recursion may be performed in a depth-first manner, or, alternatively, in a breadth-first manner, such techniques being well-known in the art of graph theory. In a preferred embodiment, the recursion is performed depth-first, starting at the bottom (the deepest nodes in the hierarchy, i.e., leaf nodes). For example, one or more leaf subsystems may be selected for processing in a parallel or sequential manner, where each non-input bound data flow node (e.g., indirect API block) may be decomposed or expanded into its corresponding functional nodes, e.g., G-language input bound data flow equivalent functions. Note that direct API blocks (i.e., input bound primitive or atomic data flow nodes) may directly link to their G-language equivalents, and may not require decomposition. Note also that in this embodiment, since the initial processing operates on leaf subsystems, no further subsystems are embedded in the simulation diagrams at this level in the hierarchy. Thus, the operations may convert a leaf-node simulation subsystem into executable graphical program code, e.g., G-language code, i.e., a block diagram of a virtual instrument.

Given the above method, there are various ways in which the input bound data flow diagram may be generated. For example, in one embodiment, the conversion may modify the data flow diagram itself. In other words, the converting may change the data flow diagram to the input bound data flow diagram.

As noted above, in some embodiments, the input bound data flow diagram may be a companion diagram (i.e., an underlying diagram) for an original data flow diagram, where the companion diagram executes in lieu of the original diagram, where, for example, the original data flow diagram may be displayed, and where the input bound data flow diagram may not be displayed.

For example, in one embodiment, the data flow diagram described above may be a copy of an original data flow diagram, where the (unchanged) original data flow diagram is viewable by the user, and the conversion modifies or changes the data flow diagram (the copy) into the input bound data flow diagram, and so the generated input bound data flow diagram may be a companion diagram to the original data flow diagram, as discussed above, where the companion diagram may not be viewable to the user (the user may not even be aware of the companion diagram), and may be executed in place of the original diagram.

In a further embodiment, the input bound data flow diagram may be generated from scratch as the data flow diagram is processed. For example, as the nodes in the data flow diagram are processed, each input bound data flow node may be copied to the (new) input bound data flow diagram, and for each non-input bound data flow node in the data flow diagram, the respective two or more input bound data flow nodes determined in 508 may be included in the input bound data flow diagram, which may be a companion diagram with respect to the data flow diagram.

In yet another embodiment, the processing may be performed per sub-diagram. In other words, the original data flow diagram may be traversed, e.g., depth-first, bottom up, where sub-diagrams (diagrams in the (hierarchical) data flow diagram) are copied to the (initially empty) input bound data flow diagram and converted as described above. Said another way, the conversion or modification may be performed on sub-diagrams copied from the original data flow diagram, where after the conversion process is complete, all the converted copies of sub-diagrams compose the input bound data flow diagram.

Thus, in some embodiments, the conversion process described above may generate the input bound data flow diagram without destroying the original data flow diagram, and may be considered a companion diagram that is associated with the original diagram, as discussed above.

In some cases, after the conversion described above has been performed, thereby generating the input bound data flow diagram (the companion diagram), the original data flow diagram may be modified, and so the input bound data flow diagram will be "out of sync" with the original diagram. Of course, the above method could simply be repeated with respect to the modified data flow diagram to generate a corresponding input bound data flow diagram; however, this is an inefficient approach, since those portions of the diagram that were not changed would still be processed. Thus, in some embodiments, in response to functional changes in the data flow diagram, the method may include updating the input bound data flow diagram by performing the above-described analyzing and including only with respect to changed portions of the data flow diagram.

Additionally, in some embodiments, by storing any newly created input bound data flow nodes, including those that correspond to non-input bound data flow nodes, including subsystem nodes, and possibly input bound data flow nodes that represent the determined input bound data flow sub-diagrams generated by the partitioning of 509, both processing and storage may be saved by avoiding redundancies in the creation and storage of the input bound data flow nodes. Thus, for example, if there are multiple instances of a non-input bound node in the diagram, corresponding instances of the same replacement input bound data flow nodes may be used in the input bound data flow diagram. Similarly, input bound data flow nodes representing respective partitions ("clumps") may be stored, and retrieved for use anywhere those partitions (sub-diagram portions) occur in the diagram.

Moreover, in some embodiments where the data flow diagram is to be executed, which may actually mean that the companion diagram is executed, the created nodes may also be pre-compiled, which may provide further efficiencies, since executing the input bound data flow diagram would necessitate linking in these precompiled nodes, as opposed to having to compile all the nodes from scratch. In fact, in some embodiments, all the input bound data flow nodes may be pre-compiled and stored for later retrieval. In some embodiments, the compiling and/or linking of pre-compiled code may be performed recursively, possibly as part of the above conversion process. Said another way, in some embodiments, the conversion process may be performed as part of a compilation process, where pre-compiled code is used as desired (and as available or possible).

While embodiments described above relate to various nodes and subsystems (e.g., subdiagrams or subVIs), it should be noted that similar methods may apply to any graphical structures which contain code. For example, similar methods may apply to loop or iteration structures, in place memory structures, target execution icon structures, case structures, etc. Accordingly, the following sections describe the application of the conversion and/or partitioning of nodes described above to case structures in a data flow diagram. It should be noted that any of the descriptions and methods described above may apply to the methods described below. For example, the analysis, conversion, substitution, and/or partitioning (among others) described above, may apply below.

Figure 8:
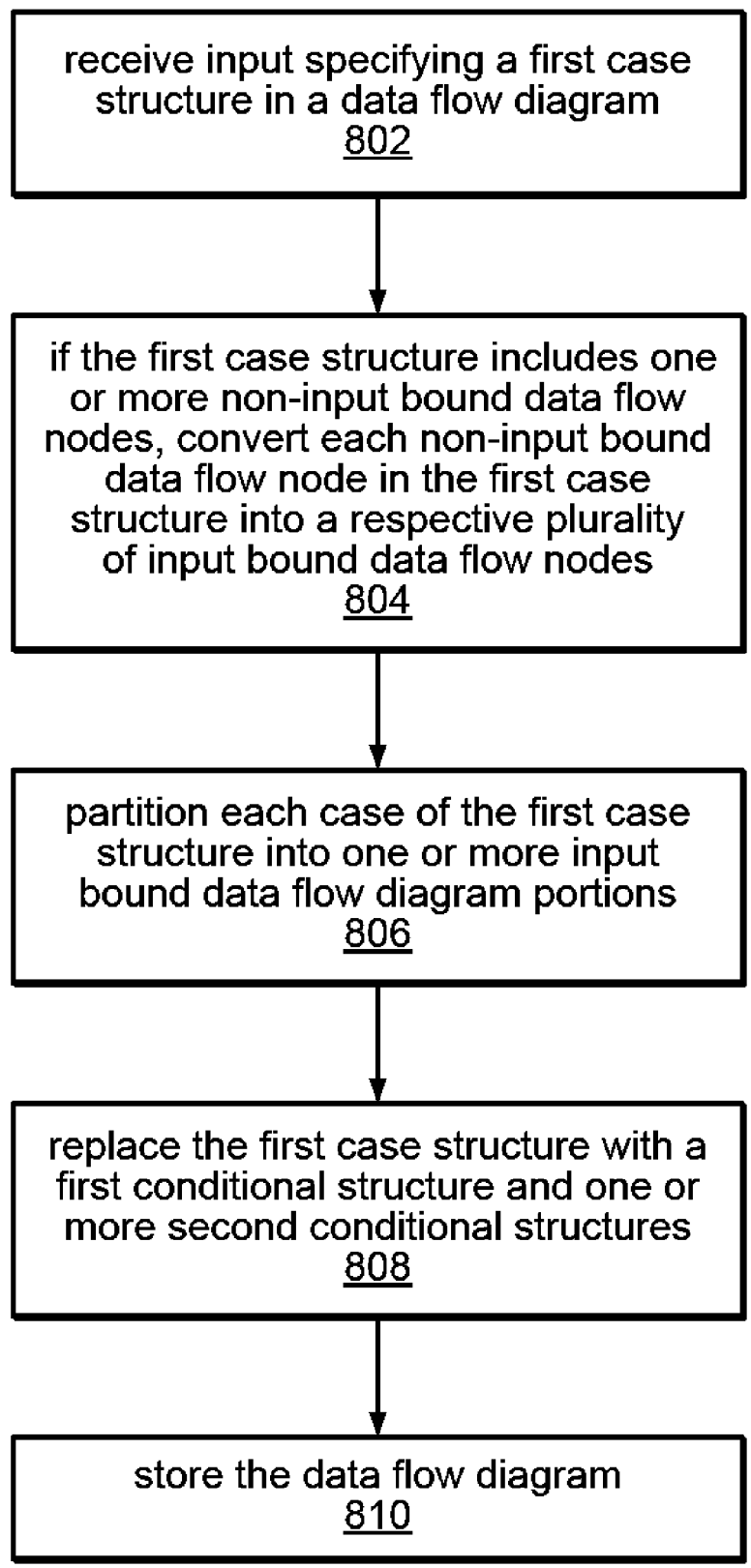
FIG. 8 is a flowchart diagram illustrating one embodiment of a method for including a case structure in a data flow diagram, according to one embodiment.

FIG. 8—Non-Input Bound Cases in a Case Structure

FIG. 8 is a high-level flowchart of a method for generating a data flow diagram, according to one embodiment. In various embodiments, one or more of the method elements described may be performed concurrently, in a different order than shown, or omitted. Additional steps may also be performed as desired. The method shown in FIG. 8 may be used in conjunction with any of the computer systems or devices shown in the above figures, among other devices. As shown, this method may operate as follows.

In 802, input specifying a first case structure in a data flow diagram may be received. In some embodiments, the input may be received as user input to the data flow diagram using a development environment. However, other types of input are envisioned. In one embodiment, the first case structure may be created automatically in response to input specifying desired functionality, or in response to other stimuli.

Specification of the first case structure may include specification of the cases/frames, the conditions for each case, and/or the graphical code for execution for each case, among others. In some embodiments, the first case structure includes a case which is a non-input bound data flow entity. Note that, as described above, this case of the first case structure may be a non-input bound data flow entity because it includes at least one non-input bound data flow node, or may only include input bound data flow nodes, but still be a non-input bound data flow entity because of its structure, i.e., its topology.

As used herein, a case structure refers to a graphical structure in a diagram which operates to receive input and invoke execution of graphical code based on associated conditions of the case structure. In primary embodiments, the graphical code is contained in an interior portion of the case structure. An exemplary case structure is used and described in LabVIEW® provided by National Instruments.

Figure 9A:
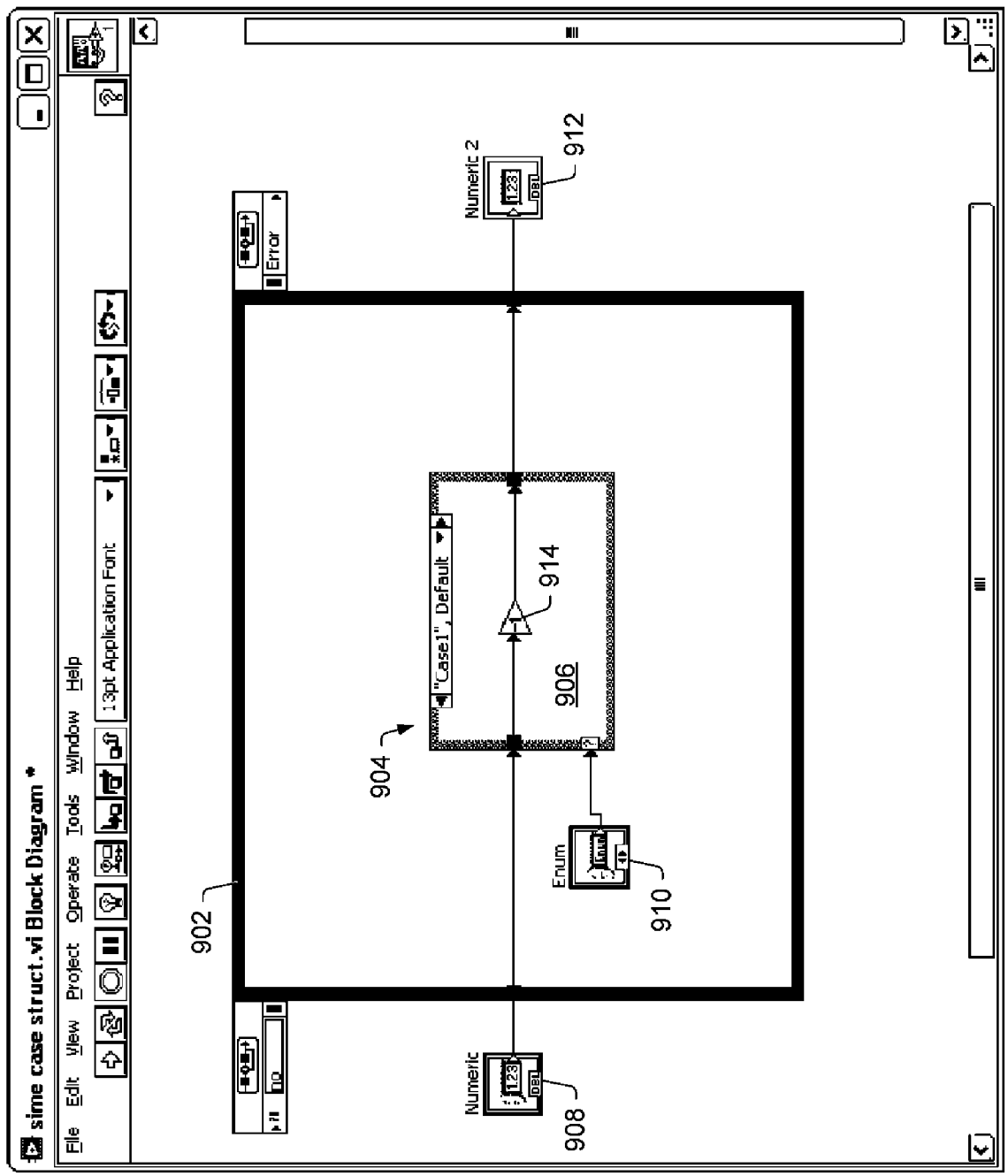
FIGS. 9A and 9B are exemplary screenshots illustrating a case structure in a data flow diagram.
Figure 9B:
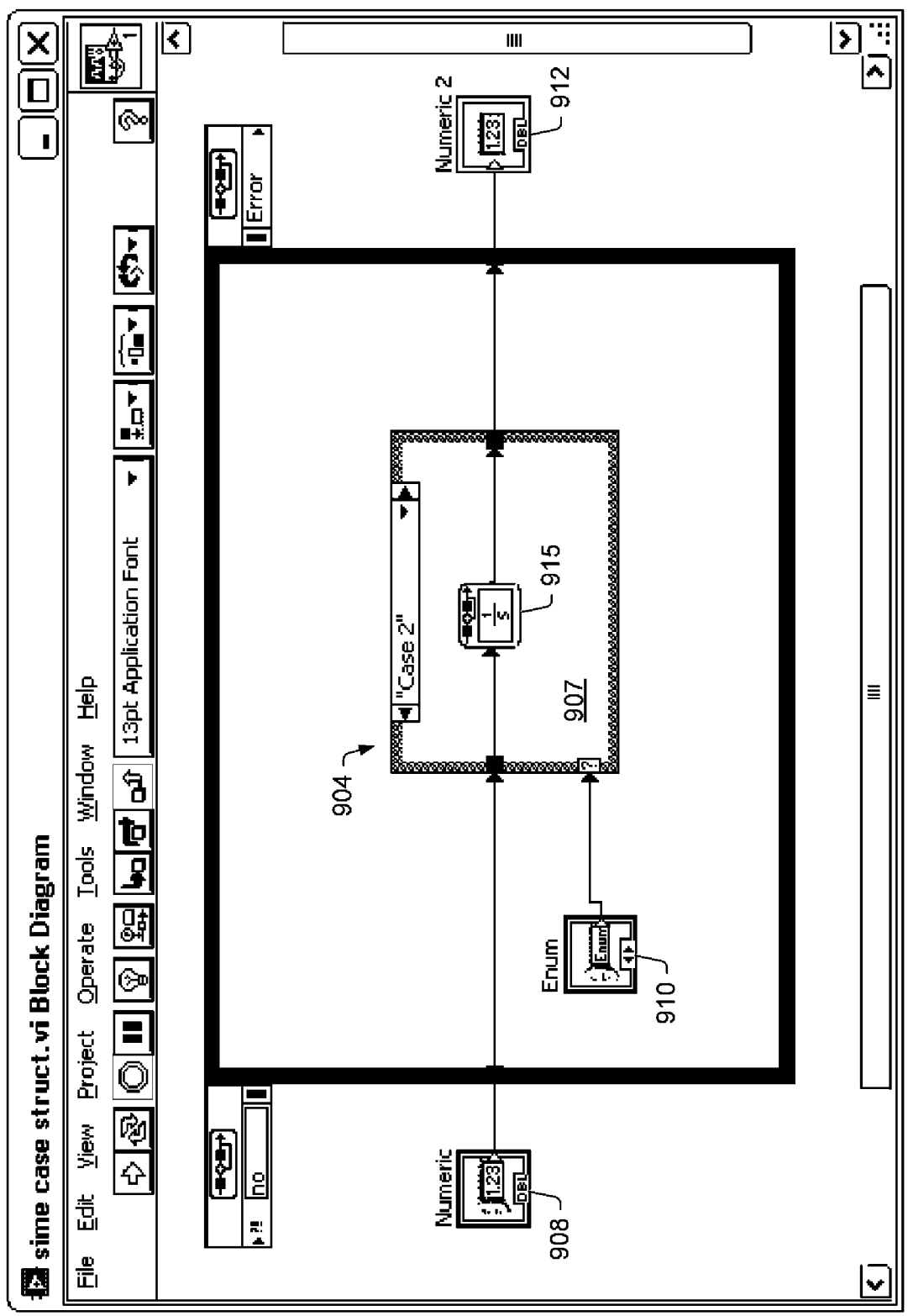

Additionally, FIGS. 9A and 9B illustrate an exemplary specified case structure in a data flow diagram. More specifically, FIGS. 9A and 9B illustrate an exemplary data flow diagram with a simulation loop 902 and case structure 904. As shown, the exemplary case structure 904 may include a graphical frame (sometimes referred to as a case of the case structure) for each set of conditions. For example, in FIG. 9A, as indicated by the "Case1", Default label, the case structure 904 is currently displaying code for a first case or frame of the case structure 904 (referred to as 906). Each frame may include graphical code which is executed if the conditions for that frame or case is met. As also shown, the exemplary case structure receives inputs and provides outputs. These inputs and outputs may be coupled to each of the frames of the case structure. In other words, each frame may receive and provide the same inputs and outputs. As shown in FIG. 9A, the case structure receives numeric 908 and enum 910 as inputs and provides output via numeric2 912. In this case, the code for the first frame, when the enum is "Case1", decrements the received numeric by 1 according to decrementor 914. In contrast, as shown in frame 907 of FIG. 9B, when the enum is "Case 2", the numeric is manipulated according to an integrator 915, which is a non-input bound data flow node. Thus, FIGS. 9A and 9B illustrate an exemplary specified case structure. Note that this case structure is exemplary only, and other case structures are envisioned.

In 804, similar to descriptions above, if the first case structure includes one or more non-input bound data flow nodes, each non-input bound data flow node in the first case structure may be converted into a respective plurality of input bound data flow nodes according to the methods described above. As indicated above, the plurality of input bound data flow nodes may be mutually independent or independently callable. For example, after conversion, the plurality of input bound data flow nodes may not be directly connected or wired together. Thus, if the first case structure includes any non-input bound data flow nodes (e.g., in one or more of the cases of the first structure), they may be converted to input bound data flow nodes. Following the example of frame 906 in FIG. 9B, conversion of integrator 915 may result in two non-connected input bound data flow nodes.

In 806, similar to descriptions above, each case of the first case structure may be partitioned into one or more input bound data flow diagram portions. In some embodiments, at least one of the cases may be partitioned into a plurality of input bound data flow diagram portions. For example, where a case previously included a non-input bound data flow node, two groups of nodes may be easily divided based on the new input bound data flow nodes (or the connectivity thereof). Alternatively, where the case included only input bound data flow nodes, the case may be partitioned based on dependencies. For example, where a case includes a first input which is coupled to a first output (without other input) and a second input that is coupled to a second output (without other input), the graphical code may be separated so that a first portion comprises the code between the first input and the first output and a second portion comprises the code between the second input and the second output. Thus, each case of the first case structure may be partitioned into one or more input bound data flow diagram portions.

In 808, the first case structure may be replaced with a first conditional structure and one or more second conditional structures. The first conditional structure may operate to select or invoke execution (e.g., at runtime) of the data flow diagram portions partitioned in 806. In one embodiment, the first conditional structure may itself be a case structure. The first conditional structure may include the same conditions associated with the first case structure, and may invoke (or otherwise provide information that results in invocation) the data flow diagram portions of the case associated with the provided condition/trigger (i.e., from the input of the first case structure). In other words, the first conditional structure may invoke execution of the individual data flow diagram portions according to the cases, conditions, and code specified for the first case structure.

In one embodiment there may be one or more first conditional structures for enabling execution of the data flow diagrams portions partitioned in 806. For example, each first conditional structure may correspond to each case of the case structure. These first conditional structures may thus produce enable signals for invoking execution of the respective data flow diagram portions of their respective case.

Alternatively, each first conditional structure may correspond to each data flow diagram portion and may invoke execution of the data flow diagram portion according to the condition of the case from which the data flow diagram was originally partitioned. Thus, each first conditional structure may invoke a single data flow diagram portion (if there is a one-to-one correspondence of the data flow diagram portions) or may produce an enable signal for invoking a plurality of the data flow diagram portions (e.g., according to the conditions of the case which originally contained the data flow diagram portions). Thus, the first case structure may be replaced by one or more first conditional structures.

Where the first conditional structure(s) produces an enable signal, each of the data flow diagram portions may be included in individual conditional structures or case structures in order to invoke conditional execution based on the first conditional structure. These case structures may include the data flow diagram portion for the condition of, for example, a TRUE Boolean, and may not include any code when, for example, a FALSE Boolean. Thus, each of the data flow diagram portions may be conditionally executed based on outputs from the first conditional structure(s). For example, where there is a first conditional structure for each case of the first case structure, the first conditional structure may provide a TRUE or FALSE Boolean which may be provided as input to the conditional structures for each of the data flow diagram portions. Thus, the first conditional structure(s) may provide input to the conditional structures of each data flow diagram portion in order to invoke execution.

The one or more second conditional structures may operate to select appropriate output(s) from the data flow diagram portions invoked by the first conditional structure(s). Similar to the first conditional structure, the second conditional structures may include the same conditions associated with the first case structure and may select outputs from the data flow diagram portions of the case associated with the provided condition/trigger. Similar to above, the second conditional structures may be case structures.

In some embodiments, each of the second conditional structures may correspond to an output of the first case structure, e.g., in a one-to-one relationship. Thus, in one embodiment, for each output of the first case structure, a conditional structure may be generated which uses the conditions of the first case structure, and the outputs of the data flow diagram portions which correspond to each cases output of the given output. Using a conditional structure for each output may allow outputs to fire as soon as possible as opposed to using a single output conditional structure which may require that every input be present even if one of the outputs could already be provided. Thus, second conditional structures may correspond to each output of the first case structure.

Similar to descriptions above, 808 may be performed in a variety of different methods. For example, replacing the case structure may occur in the data flow diagram in which the case structure was defined. Correspondingly, after the case structure is specified, it may be replaced with the various conditional structures/case structures described above. In other words, the case structure may be removed from the diagram (as displayed to a user) and the new conditional structures/case structures may be automatically included.

Alternatively, replacing the case structure may occur in a diagram that isn't displayed to the user, e.g., in a companion or underlying diagram. In some embodiments, e.g., at compile time, the diagram (or a portion or subdiagram) may be copied and the case structure included in the diagram may be replaced according to the methods described above.

In one embodiment, replacing the case structure may occur in a separate diagram without copying the original case structure over. In other words, a new diagram (e.g., a companion diagram or underlying diagram that may be used during execution) may be created by analyzing the original diagram (or portions/subdiagrams thereof) and including corresponding structures in the new diagram. For example, where a case structure is specified in the original diagram, the structures described above may be included in the diagram, e.g., without copying the first case structure. Other replacements in the new diagram are envisioned, such as those described above, among others. Where no substitute or change is required, the elements of the original diagram may be simply copied to the new diagram.

Figure 10:
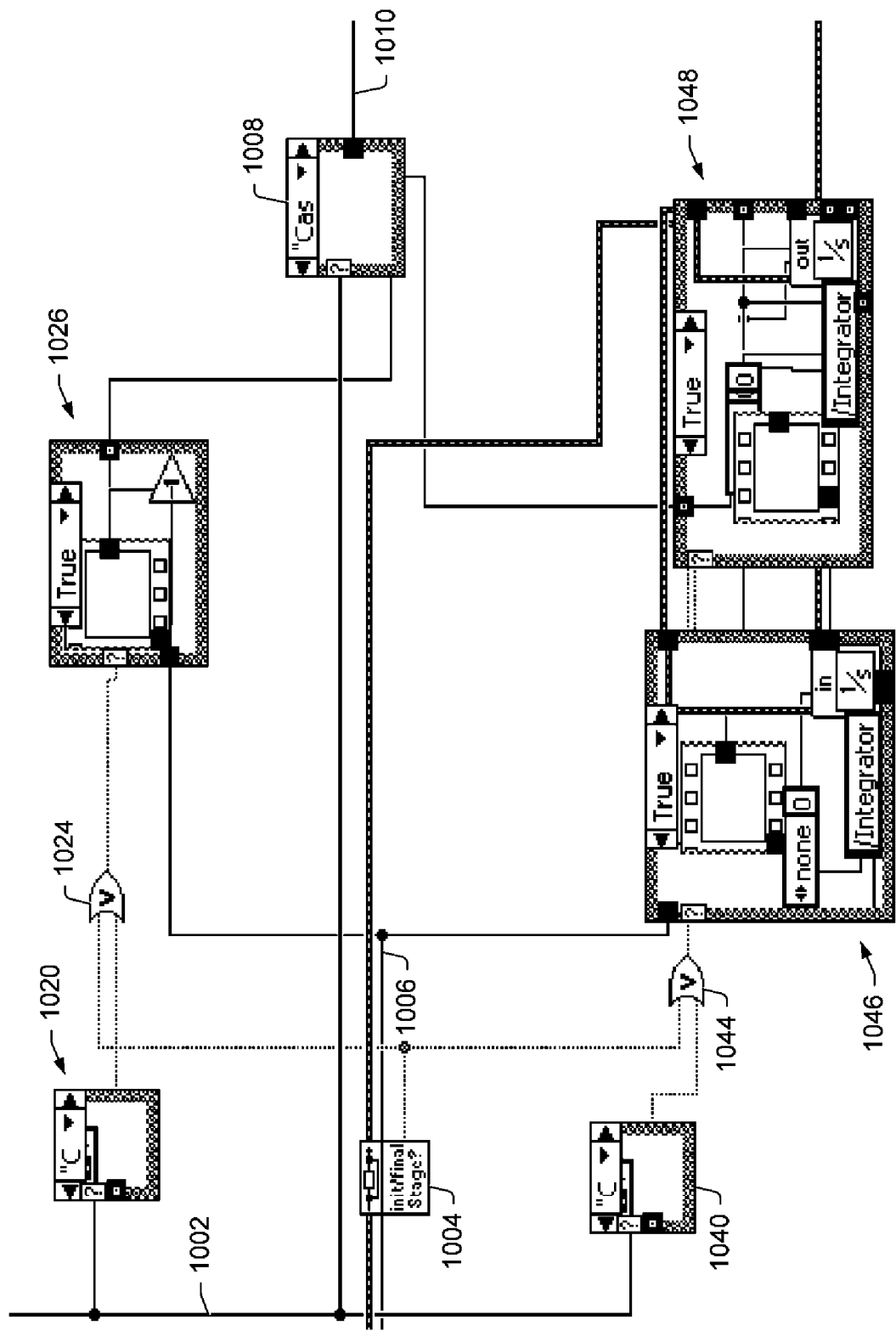
FIG. 10 is an exemplary screenshot of conditional structures replacing the case structure of FIGS. 9A and 9B, according to one embodiment.

FIG. 10 illustrates an exemplary input bound data flow diagram resulting from one embodiment of the methods described above. The exemplary data flow diagram of FIG. 10 corresponds to the automatic replacing of case structure 804 with two first conditional structures, data flow diagram portions with associated case structures, and a second conditional structure. More specifically, FIG. 10 includes case selector wire 1002 (from enum 810) which is provided to case structures 1020 and 1040. These case structures provide a TRUE or FALSE Boolean to the case structures of each data flow diagram portion (1026, 1046, and 1048). As shown, these Boolean values are combined with an init/final stage value (from 1004) which determines whether the Boolean provided to the data flow diagram portion case structures are TRUE or FALSE. The case structure 1020 provides a TRUE Boolean to OR 1024 if the enum provides "Case1" (or any other value than "Case 2" since it is default). The case structure 1040 provides a TRUE Boolean to OR 1044 if the enum provides "Case 2". Thus, the case structures 1020 and 1040 correspond to the original conditions of the first case structure.

Only one case structure results for "Case1" since the single decrementor node 814 can only be partitioned into a single data flow diagram portion. Two case structures result for "Case 2" since the single integrator node 915 has been converted to two separate and independently callable integrator nodes (thus resulting in two clumps, and correspondingly two case structures 1046 and 1048). Case structures 1026, 1046, and 1048 all receive the input from numeric 908 via input wire 1006. Finally, output case structure 1008 uses the same conditions from the original case structure 804 to select outputs from case structures 1026 and 1048 using the output from enum 810 via wire 1002. The corresponding output of case structure 1008 is provided to numeric 2 812 via output wire 1010. Thus, FIG. 10 illustrates an exemplary data flow diagram resulting from the conversion of the first case structure to a plurality of case structures. Note that this diagram may or may not be displayed to the user as described above. Note further that this diagram may be used for execution of the original diagram shown in FIGS. 9A and 9B, e.g., at compile or run time.

In 810, the diagram, e.g., the original data flow diagram with replacements, or the companion diagram with the conditional structures, may be stored on a memory medium.

Thus, in response to input specifying a case structure in a data flow diagram, conversions, partitions, and/or structures may be automatically performed and generated. These methods may be especially useful in data flow diagrams such as simulation diagrams where case structures previously could not be implemented. More specifically, the methods described above may allow for the use of case structures in diagrams whose data flow semantics do not allow non-input bound data flow when indirect feedthrough is desired.

Although the embodiments above have been described in considerable detail, numerous variations and modifications may become apparent to those skilled in the art once the above disclosure is fully appreciated. It is intended that the following claims be interpreted to embrace all such variations and modifications.

I claim:

1. A method for generating a data flow diagram, the method comprising:
    a computer system providing a data flow diagram, wherein the data flow diagram comprises one or more non-input bound data flow nodes, each with a respective functionality, wherein at least one non-input bound data flow node in the data flow diagram is a subsystem node representing a non-input bound data flow sub-diagram comprising a plurality of interconnected nodes;
    the computer system converting all non-input bound data flow nodes in the data flow diagram into input bound data flow nodes to produce an input bound data flow diagram, said converting comprising:
        for each non-input bound data flow node in the data flow diagram:
            analyzing the non-input bound data flow node to determine two or more input bound data flow nodes executable to perform the functionality of the non-input bound data flow, wherein each of the two or more input bound data flow nodes is independently callable, wherein, for each non-input bound data flow node that is a subsystem node, said analyzing comprises:
                partitioning the non-input bound data flow sub-diagram into a plurality of input bound data flow sub-diagrams, wherein each of the input bound data flow sub-diagrams operates according to input bound data flow semantics without changing data dependencies of the non-input bound data flow sub-diagram, wherein said determining the two or more input bound data flow nodes comprises determining two or more input bound data flow nodes respectively representing the plurality of input bound data flow sub-diagrams; and
            including the two or more input bound data flow nodes in the input bound data flow diagram in lieu of the non-input bound data flow node;
    the computer system storing the input bound data flow diagram on a memory medium.

2. The method of claim 1, wherein said determining comprises:
    if any of the two or more input bound data flow nodes have not already been created, creating the input bound data flow nodes that have not already been created based on the functionality of the non-input bound data flow node, and storing the created input bound data flow nodes; and
    if any of the two or more input bound data flow nodes have already been created, retrieving already created input bound data flow nodes.

3. The method of claim 2, wherein said creating the two or more input bound data flow nodes is performed automatically.

4. The method of claim 2, wherein said creating the two or more input bound data flow nodes is performed manually.

5. The method of claim 1, wherein the non-input bound data flow sub-diagram initially comprises at least one non-input bound data flow node, and wherein said analyzing the non-input bound data flow node further comprises:
    for each non-input bound data flow node in the non-input bound data flow sub-diagram,
        performing said analyzing and said including.

6. The method of claim 1, wherein said partitioning is performed based on input and output data dependencies of the interconnected nodes of the non-input bound data flow sub-diagram.

7. The method of claim 6, wherein said partitioning further comprises:
    computing a feed-through map for the non-input bound data flow sub-diagram indicating dependencies of each output of the non-input bound data flow sub-diagram upon inputs of the non-input bound data flow sub-diagram;
    analyzing the feed-through map to determine at least two of the input bound data flow sub-diagrams that, if merged, would not produce any new data dependencies of the outputs of the non-input bound data flow sub-diagram upon inputs of the non-input bound data flow sub-diagram
    merging the at least two of the input bound data flow sub-diagrams.

8. The method of claim 1, wherein said analyzing and said including are performed automatically.

9. The method of claim 1, wherein the input bound data flow diagram is characterized by an input bound data flow model of computation.

10. The method of claim 1, wherein the input bound data flow diagram is a companion diagram of an original data flow diagram, wherein the original data flow diagram is displayed, and wherein the input bound data flow diagram is not displayed.

11. The method of claim 10, further comprising:
in response to functional changes in the original data flow diagram, updating the input bound data flow diagram, comprising performing said converting only with respect to changed portions of the original data flow diagram.

12. The method of claim 10, wherein the data flow diagram is a copy of the original data flow diagram, wherein said converting changes the data flow diagram to the input bound data flow diagram.

13. The method of claim 10, wherein the data flow diagram is the original data flow diagram, wherein said converting generates the input bound data flow diagram as a new diagram without modifying the data flow diagram.

14. The method of claim 1, wherein said converting changes the data flow diagram to the input bound data flow diagram.

15. The method of claim 1, wherein said converting all non-input bound data flow nodes in the data flow diagram into input bound data flow nodes comprises:
performing said partitioning and said including for each non-input bound data flow subsystem node in the data flow diagram in a recursive manner.

16. A computer-accessible memory medium that stores program instructions for generating a data flow diagram, wherein the program instructions are executable by a processor to perform:
providing a data flow diagram, wherein the data flow diagram comprises one or more non-input bound data flow nodes, each with a respective functionality, wherein at least one non-input bound data flow node in the data flow diagram is a subsystem node representing a non-input bound data flow sub-diagram comprising a plurality of interconnected nodes;
converting all non-input bound data flow nodes in the data flow diagram into input bound data flow nodes to produce an input bound data flow diagram, said converting comprising:
for each non-input bound data flow node in the data flow diagram:
analyzing the non-input bound data flow node to determine two or more input bound data flow nodes executable to perform the functionality of the non-input bound data flow, wherein each of the two or more input bound data flow nodes is independently callable, wherein, for each non-input bound data flow node that is a subsystem node, said analyzing comprises:
partitioning the non-input bound data flow sub-diagram into a plurality of input bound data flow sub-diagrams, wherein each of the input bound data flow sub-diagrams operates according to input bound data flow semantics without changing data dependencies of the non-input bound data flow sub-diagram, wherein said determining the two or more input bound data flow nodes comprises determining two or more input bound data flow nodes respectively representing the plurality of input bound data flow sub-diagrams; and
including the two or more input bound data flow nodes in the input bound data flow diagram in lieu of the non-input bound data flow node; and
storing the input bound data flow diagram.

17. The memory medium of claim 16, wherein said determining comprises:
if any of the two or more input bound data flow nodes have not already been created, creating the input bound data flow nodes that have not already been created based on the functionality of the non-input bound data flow node, and storing the created input bound data flow nodes; and
if any of the two or more input bound data flow nodes have already been created, retrieving already created input bound data flow nodes.

18. The memory medium of claim 17, wherein the non-input bound data flow sub-diagram initially comprises at least one non-input bound data flow node, and wherein said analyzing the non-input bound data flow node further comprises:
for each non-input bound data flow node in the non-input bound data flow sub-diagram,
performing said analyzing and said including.

19. The memory medium of claim 17, wherein said partitioning is performed based on input and output data dependencies of the interconnected nodes of the non-input bound data flow sub-diagram.

20. The memory medium of claim 19, wherein said partitioning further comprises:
computing a feed-through map for the non-input bound data flow sub-diagram indicating dependencies of each output of the non-input bound data flow sub-diagram upon inputs of the non-input bound data flow sub-diagram;
analyzing the feed-through map to determine at least two of the input bound data flow sub-diagrams that, if merged, would not produce any new data dependencies of the outputs of the non-input bound data flow sub-diagram upon inputs of the non-input bound data flow sub-diagram
merging the at least two of the input bound data flow sub-diagrams.

21. The memory medium of claim 16, wherein the input bound data flow diagram is a companion diagram of an original data flow diagram, wherein the original data flow diagram is displayed, and wherein the input bound data flow diagram is not displayed.

22. The memory medium of claim 21, wherein the program instructions are further executable to perform:
in response to functional changes in the original data flow diagram, updating the input bound data flow diagram, comprising performing said converting only with respect to changed portions of the original data flow diagram.

23. The memory medium of claim 16, wherein said converting all non-input bound data flow nodes in the data flow diagram into input bound data flow nodes comprises:
performing said analyzing and said including for each non-input bound data flow subsystem node in the data flow diagram in a recursive manner.

24. A system, comprising:
a processor; and
a memory medium, coupled to the processor, wherein the memory medium stores program instructions executable by the processor to:

provide a data flow diagram, wherein the data flow diagram comprises one or more non-input bound data flow nodes, each with a respective functionality, wherein at least one non-input bound data flow node in the data flow diagram is a subsystem node representing a non-input bound data flow sub-diagram comprising a plurality of interconnected nodes;

convert all non-input bound data flow nodes in the data flow diagram into input bound data flow nodes to produce an input bound data flow diagram, wherein to convert all non-input bound data flow nodes, the program instructions are executable to:

for each non-input bound data flow node in the data flow diagram:

analyze the non-input bound data flow node to determine two or more input bound data flow nodes executable to perform the functionality of the non-input bound data flow, wherein each of the two or more input bound data flow nodes is independently callable, wherein, for each non-input bound data flow node that is a subsystem node, to analyze the non-input bound data flow node, the program instructions are executable to:

partition the non-input bound data flow sub-diagram into a plurality of input bound data flow sub-diagrams, wherein each of the input bound data flow sub-diagrams operates according to input bound data flow semantics without changing data dependencies of the non-input bound data flow sub-diagram, wherein to determining the two or more input bound data flow nodes, the program instructions are executable to determine two or more input bound data flow nodes respectively representing the plurality of input bound data flow sub-diagrams; and include the two or more input bound data flow nodes in the input bound data flow diagram in lieu of the non-input bound data flow node; and store the input bound data flow diagram.

25. The system of claim 24, wherein said determining comprises:

if any of the two or more input bound data flow nodes have not already been created, creating the input bound data flow nodes that have not already been created based on the functionality of the non-input bound data flow node, and storing the created input bound data flow nodes; and if any of the two or more input bound data flow nodes have already been created, retrieving already created input bound data flow nodes.

26. The system of claim 25, wherein the non-input bound data flow sub-diagram initially comprises at least one non-input bound data flow node, and wherein said analyzing the non-input bound data flow node further comprises:

for each non-input bound data flow node in the non-input bound data flow sub-diagram, performing said analyzing and said including.

27. The system of claim 25, wherein said partitioning is performed based on input and output data dependencies of the interconnected nodes of the non-input bound data flow sub-diagram.

28. The system of claim 27, wherein said partitioning further comprises:

computing a feed-through map for the non-input bound data flow sub-diagram indicating dependencies of each output of the non-input bound data flow sub-diagram upon inputs of the non-input bound data flow sub-diagram;

analyzing the feed-through map to determine at least two of the input bound data flow sub-diagrams that, if merged, would not produce any new data dependencies of the outputs of the non-input bound data flow sub-diagram upon inputs of the non-input bound data flow sub-diagram merging the at least two of the input bound data flow sub-diagrams.

29. The system of claim 24, wherein the input bound data flow diagram is a companion diagram of an original data flow diagram, wherein the original data flow diagram is displayed, and wherein the input bound data flow diagram is not displayed.

30. The system of claim 29, wherein the program instructions are further executable by the processor to:

in response to functional changes in the original data flow diagram, update the input bound data flow diagram, comprising performing said converting only with respect to changed portions of the original data flow diagram.

31. The system of claim 24, wherein said converting all non-input bound data flow nodes in the data flow diagram into input bound data flow nodes comprises:

performing said analyzing and said including for each non-input bound data flow subsystem node in the data flow diagram in a recursive manner.

* * * * *